(12) United States Patent
Matsubara et al.

(10) Patent No.: US 8,192,325 B2
(45) Date of Patent: Jun. 5, 2012

(54) CONTROL DEVICE OF VEHICULAR DRIVING APPARATUS

(75) Inventors: Tooru Matsubara, Toyota (JP); Atsushi Tabata, Okazaki (JP); Taku Akita, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 443 days.

(21) Appl. No.: 12/448,302

(22) PCT Filed: Dec. 7, 2007

(86) PCT No.: PCT/JP2007/073725
§ 371 (c)(1),
(2), (4) Date: Jun. 17, 2009

(87) PCT Pub. No.: WO2008/075576
PCT Pub. Date: Jun. 26, 2008

(65) Prior Publication Data
US 2010/0044132 A1 Feb. 25, 2010

(30) Foreign Application Priority Data

Dec. 21, 2006 (JP) ................................ 2006-345080

(51) Int. Cl.
*B60W 10/08* (2006.01)
(52) U.S. Cl. ................................ 477/20; 477/3; 477/15
(58) Field of Classification Search .................. 477/3, 5, 477/15, 20
See application file for complete search history.

(56) References Cited

U.S. PATENT DOCUMENTS

| 2005/0272555 A1 | 12/2005 | Tabata et al. |
| 2009/0082154 A1* | 3/2009 | Iwase et al. .................... 475/150 |
| 2010/0041511 A1* | 2/2010 | Tabata et al. ...................... 477/3 |
| 2010/0125019 A1* | 5/2010 | Tabata et al. ...................... 477/3 |
| 2010/0151988 A1* | 6/2010 | Tabata et al. ...................... 477/3 |

FOREIGN PATENT DOCUMENTS

| JP | A-2005-344850 | 12/2005 |
| JP | A-2006-70979 | 3/2006 |
| JP | A-2006-321391 | 11/2006 |

* cited by examiner

*Primary Examiner* — Ha D. Ho
(74) *Attorney, Agent, or Firm* — Oliff & Berridge, PLC

(57) ABSTRACT

A control device of a vehicular driving apparatus is provided, which can restrain an unnecessary rotational change of a first electric motor can be restrained when a shifting in a differential portion and a shifting in a transmission portion are overlapped in shifting periods. Upon executing the shiftings of a differential portion and an automatic transmission portion in the overlapped way in the shifting periods, electric motor rotational change amount restraining means controls the first electric motor to a post-shifting prospected first electric motor rotational speed to restrain a change amount of a first electric motor rotational speed before and after a shifting of a transmission mechanism. Thus, the change amount of the first electric motor rotational speed before and after the shifting of the transmission mechanism is restrained to the minimum, thereby the unnecessary rotational change of the first electric motor can be appropriately restrained.

16 Claims, 13 Drawing Sheets

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

CONTROL DEVICE OF VEHICULAR DRIVING APPARATUS

TECHNICAL FIELD

The present invention relates to a control device of a vehicular driving apparatus which includes an electrically controlled differential portion having a differential mechanism executing a differential operation and a transmission portion disposed in a power transmitting path from the differential portion to drive wheels. In particular, the invention relates to a technique for controlling the differential portion when a shifting of the differential portion and a shifting of the transmission portion are overlapped in shifting periods.

BACKGROUND ART

There has been known a control device of a vehicular driving apparatus which includes a differential portion with a differential mechanism having a first element connected to an engine, a second element connected to a first electric motor, and a third element connected to a transmitting member so as to distribute a power of the engine to the first electric motor and the transmitting member, and a transmission portion disposed in a power transmitting path from the transmitting member to drive wheels.

For example, a following Patent Document 1 discloses such control device of the vehicular driving apparatus. The vehicular driving apparatus includes a differential portion having a differential mechanism constructed of a planetary gear set and a second electric motor operably connected to the transmitting member, and a transmission portion i.e., shifting portion constructed of a step-variable automatic transmission. A total speed ratio of the entire driving device is formed by a speed ratio of the differential portion functioning as a continuously variable transmission and a speed ratio corresponding to each gear stage (shifting stage) of the transmission portion.

Patent Document 1 discloses a technique to set a target value of the total speed ratio based on a target output, and to control the total speed ratio by controlling the speed ratio of the differential portion for obtaining the target value considering the gear stage of the transmission portion.

[Patent Document 1] Japanese Patent Publication No. 2006-70979

DISCLOSURE OF THE INVENTION

Problems to be Solved by the Invention

Meanwhile, in the control device of the vehicular driving apparatus, it is conceived that a shifting in the differential portion and a shifting in the transmission portion are overlapped in shifting periods. Upon the simultaneous shifting of the differential portion and the transmission portion, a rotational change direction of the first electric motor resulted from the shifting of the differential portion and a rotational change direction of the first electric motor resulted from an abrupt rotational change of the transmitting member (or second electric motor connected to the transmitting member) are directed in opposite directions. The abrupt rotational change is caused during an inertia phase in the shifting of a transmission, that is during the inertia phase of the transmission in the shifting process thereof. As a result, there is fear of occurring an unnecessary rotational change of the first electric motor.

Incidentally, throughout a present specification, unless a shifting of the differential portion and a shifting of the transmission portion are particularly distinguished, expression "shifting" means a shifting of the entire vehicular driving apparatus. The shifting includes a shifting executed only in the differential portion or a shifting executed only in the transmission portion, in addition to the shifting executed in both the differential portion and the transmission portion overlapped in shifting periods.

FIG. 15 shows a well known collinear chart illustrating the rotational speed of each of rotational elements constructing the differential portion. It represents one example of a rotational change of each rotational element when the differential portion and the transmission portion are downshifted in an overlapped way in the shifting periods thereof. In FIG. 15, reference "ENG" denotes a rotational speed of a first rotational element (first element) connected to an engine, reference "M1" denotes a rotational speed of a second rotational element (second element) connected to the first electric motor, and reference "M2" denotes a rotational speed of a third rotational element (third element) connected to both a transmitting member and a second electric motor. Further, each of straight lines shows a relative relation of the rotational speed of each rotational element, among which a solid line "a" shows the relative relation before the downshift, and a sold line b shows the relative relation after the downshift.

As shown in FIG. 15, when the relative relation changes from the solid line "a" to the solid line b by the downshift, there is a case where the solid line "a" once changed to a broken line c (state shown by ①) by the downshift of the differential portion, and then the broken line c changes to the solid line b (state shown by ②) by the rotational change of the second electric motor during the inertia phase in the downshift of the transmission portion. Then, as evident from FIG. 15, the rotational speed of the first electric motor (second element) once increased is lowered, thus causing an unnecessary rotational change of the first electric motor. Such unnecessary rotational change of the first electric motor generates a change in the input torque of the transmission portion, which may cause increase of a shifting shock.

Here, while problem occurred in the down shift of the differential portion is illustrated, even upon execution of the up-shiftings both in the differential portion and the transmission portion are overlapped in the shifting periods, an unnecessary rotational change of the first electric motor may occur likewise. However, each of the rotational change directions is reversed to that of downshift.

The present invention is made with such circumstances as a back ground, and has an object to provide a control device of a vehicular driving apparatus which can restrain an unnecessary rotational change of the first electric motor, when the shiftings of the differential portion and the transmission portion are overlapped of the shifting periods.

Means for Solving the Subject

For achieving the above object, the present invention relates to a control device of a vehicular driving apparatus comprises (i) a differential portion with a differential mechanism including a first element connected to an engine, a second element connected to a first electric motor, and a third element connected to a transmitting member, and distributing an output of the engine to the first electric motor and the transmitting member, to function as a part of a transmission; and (ii) a transmission portion disposed in a power transmitting path extending from the transmitting member to drive wheels for functioning as a step-variable automatic transmission.

The control device is characterized in that electric motor rotational change amount restraining means, when a shifting of the differential portion and a shifting of the transmission portion are overlapped in shifting periods, controls the first electric motor to restrain a change amount of a first electric motor rotational speed before and after the shifting.

Effect of the Invention

With such feature, when the shifting of the differential portion and the shifting of the transmission portion are overlapped in the shifting periods thereof, the electric motor rotation change amount restraining means controls the first electric motor to restrain the change amount of the first electric motor rotational speed before and after the shifting. Thus, an unnecessary rotational change of the first electric motor can be restrained, upon executing the simultaneous shiftings of the differential portion and the transmission portion.

According to a second aspect, in a first aspect, the control device further comprises post-shifting electric motor rotation prospecting means that calculates an estimated value of the first electric motor rotational speed after the shifting, based on the estimated value of a transmitting member rotational speed and the estimated value of an engine rotational speed after the shifting. The electric motor rotational change amount restraining means controls the first electric motor based on the prospected value calculated by the post-shifting electric motor rotation prospecting means.

With such feature, the first electric motor rotational speed can be changed toward the prospected value of the first electric motor rotational speed after the shifting calculated by the post-shifting electric motor rotation prospecting means. Thus, the rotational change direction of the first electric motor resulted from the shifting of the differential portion, and the rotational change direction of the first electric motor in the inertia phase resulted from the shifting of the transmission portion are prevented from being directed in the opposite directions. Consequently, the unnecessary rotational change of the first electric motor can be restrained.

According to a third aspect, in the second aspect, the electric motor rotational change amount restraining means controls the first electric motor to minimize the change amount of the first electric motor rotational speed before and after the shifting. With such feature, the unnecessary rotational change of the first electric motor can be restrained appropriately.

According to a fourth aspect, in the second or third aspect, the electric motor rotational change amount restraining means changes a start timing of changing the first electric motor rotational speed, based on (i) an increasing/decreasing direction of the first electric motor rotational speed before and after the shifting based on the prospected value calculated by the post-shifting electric motor rotation prospected means, and (ii) an increasing/decreasing direction of an engine rotational speed before and after the shifting based on the estimated value of the engine rotational speed. With such feature, the unnecessary rotational change of the first electric motor can be restrained more appropriately.

According to a fifth aspect, in the fourth aspect, when the increasing/decreasing direction of the first electric motor rotational speed and the increasing/decreasing direction of the engine rotational speed are directed in the same directions, the electric motor rotational change amount restraining means changes the first electric motor rotational speed before an inertia phase initiation of the shifting period of the transmission portion. With such feature, the shifting of the differential portion can be started rapidly.

According to a sixth aspect, in the fourth or fifth aspect, when the increasing/decreasing direction of the first electric motor rotational speed and the increasing/decreasing direction of the engine rotational speed are directed in different directions, the electric motor rotational change amount restraining means changes the first electric motor rotational speed after the inertia phase initiation of the shifting period of the transmission portion. With such feature, the rotational change of the engine rotation speed in a direction opposite to the direction toward the target rotation speed after the shifting, can be prevented.

According to a seventh aspect, in one of the fourth to sixth aspects, the electric motor rotational change amount restraining means changes the first electric motor rotational speed depending on the change of the transmitting member rotational speed after the inertia phase initiation of the shifting period of the transmission portion. With such feature, the first electric motor rotational speed can be changed toward the prospected value of the first electric motor rotational speed after the shifting calculated by the post-shifting electric motor rotation prospecting means.

According to a eighth aspect, in the first aspect, the electric motor rotational change amount restraining means holds the first electric motor rotational speed constant until the shifting in the transmission portion is completed. With such feature, the rotational change of the first electric motor in the inertia phase resulted from the shifting of the transmission portion can be prevented, to restrain the unnecessary rotational change of the first electric motor.

According to a ninth aspect, in the eighth aspect, when the shifting of the differential portion is determined during the shifting of the transmission portion, the electric motor rotational change amount restraining means holds the first electric motor rotational speed in a first electric motor rotational speed upon the determination. With such feature, the unnecessary rotational change of the first electric motor, upon the simultaneous shifting of the differential portion and the transmission portion after the shifting determination of the differential portion during the shifting of the transmission portion, can be restrained.

According to a tenth aspect, in the eighth or ninth aspect, when different kinds of the shiftings are executed in the differential portion and the transmission portion, the electric motor rotational change amount restraining means does not hold the first electric motor rotational speed constant. With such feature, stagnation of the shifting caused by holding the first electric motor rotational speed constant until the transmission portion completes the shifting, can be prevented.

According to an eleventh aspect, in the first aspect, when a continuous shifting to continuously execute a first shifting and a second shifting of the same shifting direction is executed in the transmission portion, the electric motor rotational change amount restraining means holds or fix the first electric motor rotational speed until the first shifting is completed. With such feature, upon the continuous shifting in the transmission portion, the rotational change of the first electric motor during the first shifting can be prevented, to restrain the unnecessary rotational change of the first electric motor.

According to a twelfth aspect, in the eleventh aspect, during the first shifting of the transmission portion when the second shifting of the same direction as the first shifting is determined, the electric motor rotational change amount restraining means holds the first electric motor rotational speed until the first shifting is completed. With such feature, when the second shifting is determined during the first shifting of the transmission portion, the rotational change of the first electric motor is prevented until the first shifting is completed, followed by execution of the second shifting. Consequently, the rotational change of the first electric motor in the continuous shifting can be restrained.

According to a thirteenth aspect, in the first aspect, when the first shifting and the second shifting of different shifting directions are continuously executed in the transmission portion, the electric motor rotational change amount restraining means, assuming the second shifting as a single shifting from the determination of the second shifting, controls the first electric motor rotational speed to minimize the change amount of the first electric motor rotational speed before and after the shifting, likewise the single shifting. With such feature, the rotational change of the first electric motor in both the first shifting and the second shifting can be restrained.

According to a fourteenth aspect, in the eleventh aspect, the electric motor rotational change amount restraining means controls the first electric motor rotational speed to minimize the change amount of the first electric motor rotational speed before and after the shifting, based on the prospected value of the second electric motor rotational speed and the prospected value of the target engine rotational speed after the final shifting of the continuous shifting, that is, after the second shifting. With such feature, after the final shifting in the continuous shifting, the first electric motor rotational speed is controlled to have the minimal change amount thereof before and after the shifting. Consequently, the rotational change of the first electric motor in the continuous shifting can be restrained.

According to a fifteenth aspect, in the eleventh aspect, when the first shifting and the second shifting of the same direction are continuously but independently executed step by step in the transmission portion, the electric motor rotational change amount restraining means controls the first electric motor rotational speed so as to minimize the change amount of the first electric motor rotational speed before and after shifting, respectively, based on the prospected value of the second electric motor rotational speed and the prospected value of the target engine rotational speed. With such feature, even when the first shifting and the second shifting are continuously but independently executed stepwise, the rotational change of the first electric motor in both the first shifting and the second shifting can be restrained.

According to a sixteenth aspect, in one of the first to fifteenth aspects, the differential portion is operated as a continuously variable transmission with controlling an operating state of the first electric motor. With such feature, the differential portion and the transmission portion construct a continuously variable transmission to change the drive torque smoothly.

Meanwhile, in a state with the gear ratio of the transmission portion controlled constant, the differential portion and the differential portion realize a state substantially equivalent to a step variable transmission, which can stepwise change the total gear ratio of the vehicular drive apparatus, to rapidly render the drive torque. Further, the differential portion can change the gear ratios thereof stepwise to act as the step variable transmission, besides the case of continuously changing the gear ratios.

Preferably, the differential mechanism includes a planetary gear set comprised of a first element connected to the engine, a second element connected to the first electric motor, and a third element connected to the power transmitting member. The first element is a carrier of the planetary gear set, the second element is a sun gear of the planetary gear set, and the third element is a ring gear of the planetary gear set. With such a structure, the differential mechanism has a minimized axial direction. In addition, the differential mechanism can be simply structured with a single planetary gear set.

Preferably, the planetary gear set is a single pinion type planetary gear set. With such a structure, the differential mechanism has a minimized axial direction, and can be simply structured with the single pinion type planetary gear set.

Preferably, the vehicular drive apparatus establishes a total speed ratio based on the speed ratio (gear ratio) of the transmission portion and the speed ratio of the differential portion. With such a structure, utilizing the speed ratio of the transmission portion enables a vehicle drive force to be obtained in a wide range.

DESCRIPTION OF REFERENCE NUMERALS

8: Engine
10: Shifting mechanism (vehicular driving apparatus)
11: Differential portion
16: Power distributing mechanism (differential mechanism)
18: Transmitting member
20: Automatic transmission portion (transmission portion)
34: Drive wheel
80: Electronic control unit (control unit)
86: Electric motor rotational change amount restraining means
90: Electric motor rotation estimating means after shifting
M1: First electric motor

BEST MODE FOR CARRYING OUT THE INVENTION

Now, various embodiments according to the present invention will be described below in detail with reference to the accompanying drawings.

Embodiment

Figures 1, 2:
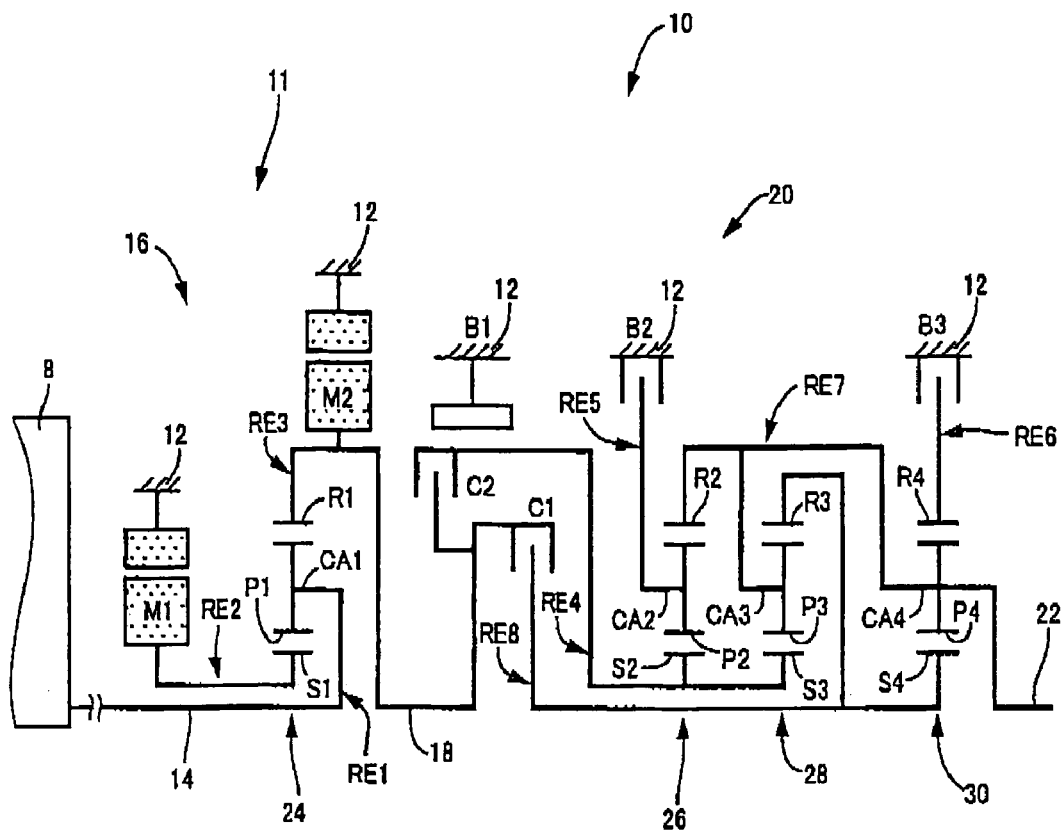
FIG. 1 is a skeleton diagram showing structure of a vehicular drive apparatus of one embodiment according to the present invention for use in a hybrid vehicle.
FIG. 2 is a functional diagram illustrating combined operations of hydraulically operated frictional coupling devices for use in the vehicular drive apparatus shown in FIG. 1.

FIG. 1 is a skeleton diagram for illustrating a transmission mechanism i.e., shifting mechanism 10 constituting a part of a drive apparatus for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 disposed inside the case 12 as an input rotary member, a differential portion 11 coaxially connected to the input shaft 14 either directly, or indirectly via a pulsation absorbing damper (vibration damping device), not shown, and serving as a continuously variable transmission portion, an automatic transmission portion 20 connected in series in a power transmitting path between the differential portion 11 and drive wheels 34 (see FIG. 7) through a power transmitting member 18 (power transmitting shaft), and an output shaft 22 connected to the automatic transmission portion 20 and serving as an output rotary member.

The transmission mechanism 10 is suitably applied to an FR (front-engine and reverse-drive) type vehicle and mounted on a vehicle along a fore and aft direction thereof.

The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the transmission mechanism 10 of the illustrated embodiment, the engine 8 and the differential portion 11 are directly connected to each other. As used herein, the term "directly connected to each other" refers to a structure under which a direct connection is established between the associated component parts in the absence of a fluid-operated power transmitting device, such as a torque converter or a fluid coupling device or the like, and a connection including, for instance, the pulsation absorbing damper is involved in such a direction connection. It is noted that a lower half of the transmission mechanism 10, which is constructed symmetrically with respect to its axis, is omitted in FIG. 1. This is also true for the other embodiments of the invention described below.

The differential portion 11 includes a first electric motor M1, a power distributing mechanism 16, structured in a mechanical mechanism for mechanically distributing an output of the engine 8 applied to the input shaft 14, which functions as a differential mechanism through which the engine output is distributed to the first electric motor M1 and the power transmitting member 18, and a second electric motor M2 operatively connected to the power transmitting member 18 to be unitarily rotate therewith. In the illustrated embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force.

The power distributing mechanism 16 includes, as a major component, a first planetary gear set 24 of a single pinion type having a gear ratio $\rho 1$ of about 0.418, for example. The first planetary gear set 24 has rotary elements (elements) composed of a first sun gear S1, a first planetary gear P1, a first carrier CA1 supporting the first planetary gear P1 such that the first planetary gear P1 is rotatable about its axis and about the axis of the first sun gear S1, and a first ring gear R1 meshing with the first sun gear S1 through the first planetary gear P1. Where the numbers of teeth of the first sun gear S1 and the first ring gear R1 are represented by ZS1 and ZR1, respectively, the above gear ratio $\rho 1$ is represented by ZS1/ZR1.

With the power distributing mechanism 16, a first carrier CA1 is connected to the input shaft 14, i.e., the engine 8; a first sun gear S1 is connected to the first electric motor M1; and a first ring gear R1 is connected to the power transmitting member 18. With the power distributing mechanism 16 of such a structure, the three elements of the first planetary gear set 24, i.e., the first sun gear S1, the first planetary gear P1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2.

Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18 regardless of the engine 8 operating at a given rotational speed. That is, the differential portion 11 functions as an electrically controlled continuously variable transmission to provide a speed ratio γ0 (rotational speed $N_{IN}$ of the input shaft 14/rotational speed $N_{18}$ of the power transmitting member 18) that is continuously variable from a minimum value γ0min to a maximum value γ0max.

The automatic transmission portion 20 includes a single-pinion type second planetary gear set 26, a single-pinion type third planetary gear set 28 and a single-pinion type fourth planetary gear set 30. The automatic transmission portion 20 is a planetary gear type multiple-step transmission operable as a step-variable automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a given gear ratio ρ2 of about "0.562". The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a given gear ratio ρ3 of about "0.425".

The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a given gear ratio ρ4 of, for instance, about "0.421". With the second sun gear S2, second ring gear R2, third sun gear S3, third ring gear R3, fourth sun gear S4 and fourth ring gear R4 having the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively.

In the automatic transmission portion 20, the second and third sun gears S2, S3 are integrally connected to each other, selectively connected to the power transmitting member 18 through a second clutch C2, and selectively connected to the casing 12 through a first brake B1. The second carrier CA2 is selectively connected to the casing 12 through a second brake B2, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and the fourth sun gear S4 are integrally connected to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to establish each gear position (shift gear position) in the automatic transmission portion 20. In other words, the first and second clutches C1, C2 function as coupling devices i.e., engaging device operable to place the power transmitting path between the power transmitting member 18 and the automatic transmission portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path. That is, with at least one of the first and second clutches C1 and C2 brought into coupling engagement, the power transmitting path is placed in the power transmitting state. In contrast, uncoupling both the first and second clutches C1 and C2 places the power transmitting path in the power cut-off state.

With the automatic transmission portion 20, further, uncoupling an on-uncoupling coupling device while coupling an on-coupling coupling device allows a so-called "clutch-to-clutch" shifting action to be executed for respective gear positions to be selectively established. This allows a speed ratio γ (rotational speed $N_{18}$ of the power transmitting member 18/rotational speed $N_{OUT}$ of the output shaft 22) to be obtained in equally varying ratio for each gear position. As indicated in the coupling operation table shown in FIG. 2, coupling the first clutch C1 and third brake B3 establishes 1st-speed gear position having a speed ratio γ1 of approximately, for instance, "3.357".

With the first clutch C1 and second brake B3 coupled in operation, a 2nd-speed gear position is established with a speed ratio γ2 of, for instance, approximately "2.180", which is lower a value of the speed ratio γ1. With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed ratio γ4 of, for instance, approximately "1.000", which is lower than the speed ratio γ3. Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake B1, second brake B2 and third brake B3 (hereinafter collectively referred to as clutch C and brake B, unless otherwise specified) are hydraulically operated frictional coupling devices that are used in the related art vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

In the transmission mechanism 10 of such a structure, the differential portion 11, serving as the continuously variable transmission, and the automatic transmission portion 20 constitute a continuously variable transmission. Further, with the differential portion 11 controlled so as to provide a speed ratio kept at a fixed level, the differential portion 11 and the automatic transmission portion 20 can provide the same state as that of a step-variable transmission.

More particularly, the differential portion 11 functions as the continuously variable transmission and the automatic transmission portion 20, connected to the differential portion 11 in series, functions as the step-variable transmission. Thus, the rotational speed, input to the automatic transmission portion 20 placed for at least one gear position M, (hereinafter referred to as "input rotational speed of the automatic transmission portion 20"), i.e., the rotational speed of the power transmitting member 18 (hereinafter referred to as "transmitting-member rotational speed $N_{18}$") are caused to continuously vary, thereby enabling the gear position M to have a continuously variable speed range. Accordingly, the transmission mechanism 10 provides an overall speed ratio γT (rotational speed $N_{IN}$ of the input shaft 14/rotational speed $N_{OUT}$ of the output shaft 22) in a continuously variable range. Thus, the continuously variable transmission is established in the transmission mechanism 10. The overall speed ratio γT of the transmission mechanism 10 is the total speed ratio γT of a whole of the automatic transmission portion 20 that is established based on the speed ratio γ0 of the differential portion 11 and the speed ratio γ of the automatic transmission portion 20.

For the respective gear positions such as, for instance, the 1st-speed to 4th-speed gear positions of the automatic transmission portion 20 and the reverse-drive gear position as indicated in the coupling operation table shown in FIG. 2, the transmitting-member rotational speed $N_{18}$ is continuously varied with each gear position being obtained in a continuously variable speed range. Accordingly, a continuously variable speed ratio is present between adjacent gear positions, enabling the whole of the transmission mechanism 10 to have the total speed ratio γT in a continuously variable range.

Further, the speed ratio γ0 of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio γT, variable in a nearly equal ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 4th-speed gear positions of the automatic transmission portion 20 and the reverse-drive gear position as indicated by the coupling operation table shown in FIG. 2. Further, if the automatic transmission portion 20 is controlled under the 4th-speed gear position so as to cause the differential portion 11 to have the speed ratio γ0 of approximately, for instance, "0.7" less than a value of "1", the automatic transmission portion 20 has the total speed ratio γT of approximately, for instance, "0.7" that is less than a value of the 4th-speed gear position.

Figure 3:
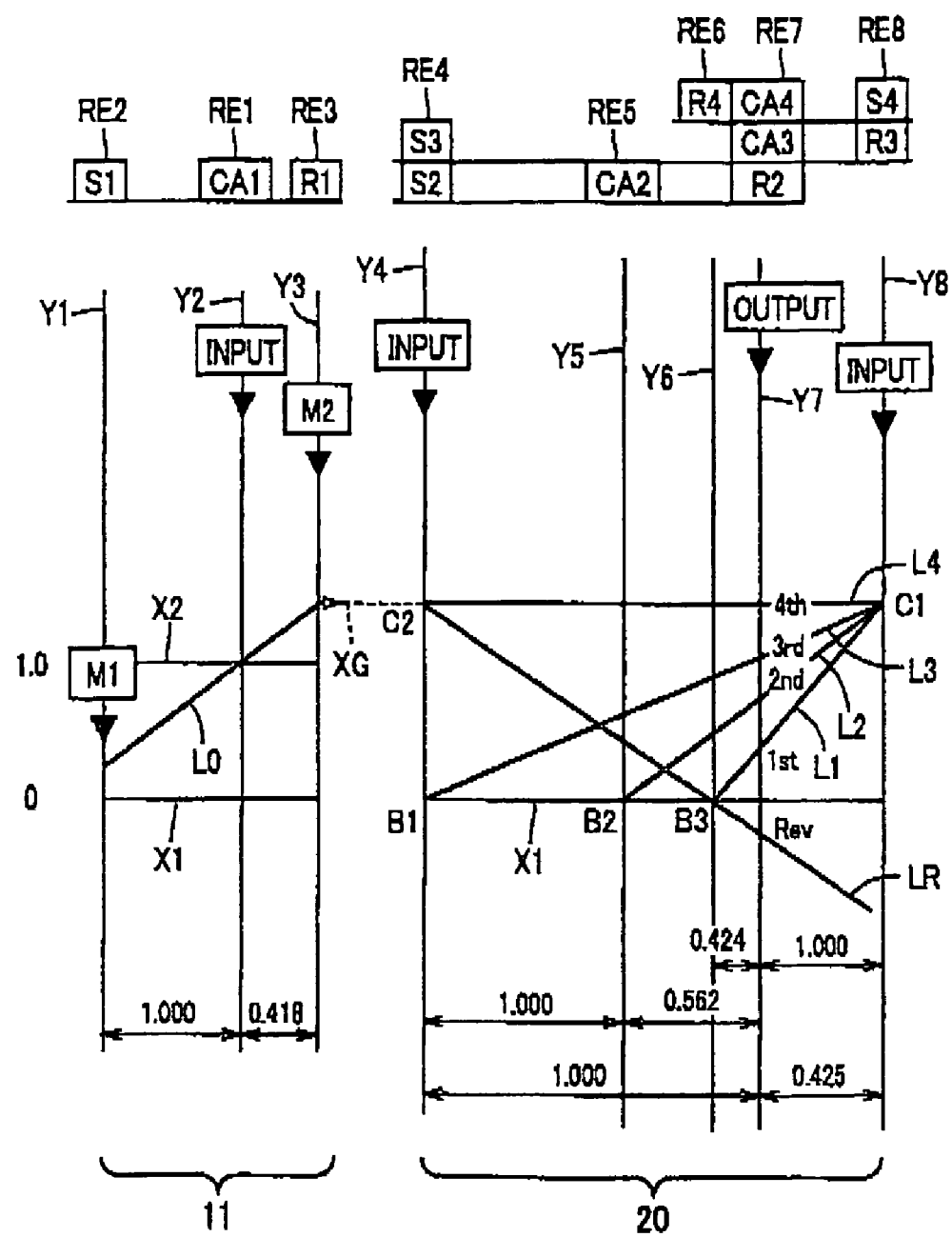
FIG. 3 is a collinear chart indicating mutually relative rotating speeds of rotary elements establishing various gear positions in the vehicular drive apparatus shown in FIG. 1.

FIG. 3 is a collinear chart for the transmission mechanism 10, including the differential portion 11 and the automatic transmission portion 20, wherein the relative motion relationships among the rotational speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26, 28, 30 and the ordinate axis plotted with the mutually relative rotating speeds of the rotary elements. A transverse line X1 indicates the rotational speed that is zeroed; a transverse line X2 the rotational speed of "1.0", that is, the rotating speed $N_E$ of the engine 8 connected to the input shaft 14; and a transverse line XG the rotational speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left, further, five vertical lines Y4, Y5, Y6, Y7 and Y8 for the automatic transmission portion 20 represent the mutually relative rotating speeds of: the second and third sun gears S2, S3, connected to each other, which corresponds to a fourth rotary element (fourth element) RE4; the second carrier CA2 corresponding to a fifth rotary element (fifth element) RE5; the fourth ring gear R4a corresponding to a sixth rotary element (sixth element) RE6; the second ring gear R2, third carriers CA3 and fourth carriers CA4, connected to each other, which correspond to a seventh rotary element (seventh element) RE7; and the third ring gear R3 and fourth sun gear S4 connected to each other and corresponding to an eighth rotary element (eighth element) RE8, respectively. Each distance between the adjacent vertical lines is determined based on the gear ratios ρ2, ρ3 and ρ4 of the second, third and fourth planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic transmission portion 20, further, the space between the sun gear and carrier is set to the distance corresponding to the value of "1" for each of the second, third and fourth planetary gear sets 26, 28, 30, for which the space between the carrier and ring gear is set to the distance corresponding to the gear ratio ρ1.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14, i.e., the engine 8 and the second rotary element RE2 is connected to the first electric motor M1. The third rotary element RE3 (first ring gear R1) is connected to the power transmitting member 18 and the second electric motor M2. Thus, a rotary motion of the input shaft 14 is transmitted (input) to the automatic transmission portion 20 through the power transmitting member 18. A relationship between the rotational speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other while the rotational speed of the first ring gear R1, indicated at an intersecting point between the straight line L0 and the vertical line Y1, is bound with the vehicle speed V and remains at a nearly constant level. In this case, as the engine speed $N_E$ is controlled with the rotational speed of the first carrier CA1, as represented by an intersecting point between the straight line L0 and the vertical line Y2, being raised or lowered, the rotational speed of the first sun gear S1, i.e., the rotational speed of the first electric motor M1, indicated by an intersecting pint between the straight line L0 and the vertical line Y1, is raised or lowered.

On controlling the rotational speed of the first electric motor M1 so as to allow the differential portion 11 to have the speed ratio γ0 of "1" with the first sun gear S1 rotating at the same speed as the engine speed $N_E$, the straight line L0 is aligned with the horizontal line X2. When this takes place, the first ring gear R1, i.e., the power transmitting member 18, is caused to rotate at the same speed as the engine speed $N_E$. On the contrary, if the rotational speed of the first electric motor M1 is controlled so as to allow the differential portion 11 to have the speed ratio γ0 of a value less than "1", for instance, a value of approximately "0.7" with the rotational speed of the first sun gear S1 being zeroed, the power transmitting member 18 is caused to rotate at an increased transmitting-member rotational speed $N_{18}$ higher than the engine speed $N_E$.

With the automatic transmission portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

Next, description is made of a case wherein with the automatic transmission portion 20, the differential portion 11 is placed in a state with the straight line L0 brought into coincidence with the horizontal line X2 to cause the differential portion 11 to transfer the vehicle drive force to the eighth rotary element RE8 at the same speed as the engine speed $N_E$ upon which the first clutch C1 and the third brake B3 are coupled as shown in FIG. 3. In this case, the rotational speed of the output shaft 22 for the 1st-speed gear position is represented by an intersecting point between the inclined line L1, passing across an intersecting point between the vertical line Y8, indicative of the rotational speed of the eighth rotary element RE8, and the horizontal line X2 and a point of intersection between the vertical line Y6, indicative of the rotational speed of the sixth rotary element RE6, and the horizontal line X1, and an intersecting point intersecting the vertical line Y7 indicative of the rotational speed of the seventh rotary element RE connected to the output shaft 22 as indicated in FIG. 3.

Similarly, the rotational speed of the output shaft 22 for the 2nd-speed gear position is represented by an intersecting point between an inclined straight line L2, determined when the first clutch C1 and second brake B2 are coupled, and the vertical line Y7 indicative of the rotational speed of the seventh rotary element RE7 connected to the output shaft 22. The rotational speed of the output shaft 22 for the 3rd-speed gear position is represented by an intersecting point between an inclined straight line L3, determined with the first clutch C1 and first brake B1 being coupled, and the vertical line Y7 indicative of the rotational speed of the seventh rotary element RE7 connected to the output shaft 22. The rotational speed of the output shaft 22 for the 4th-speed gear position is represented by an intersecting point between a horizontal straight line L4, determined with the first clutch C1 and second brake B2 being coupled, and the vertical line Y7 indicative of the rotational speed of the seventh rotary element RE7 connected to the output shaft 22.

Figure 4:
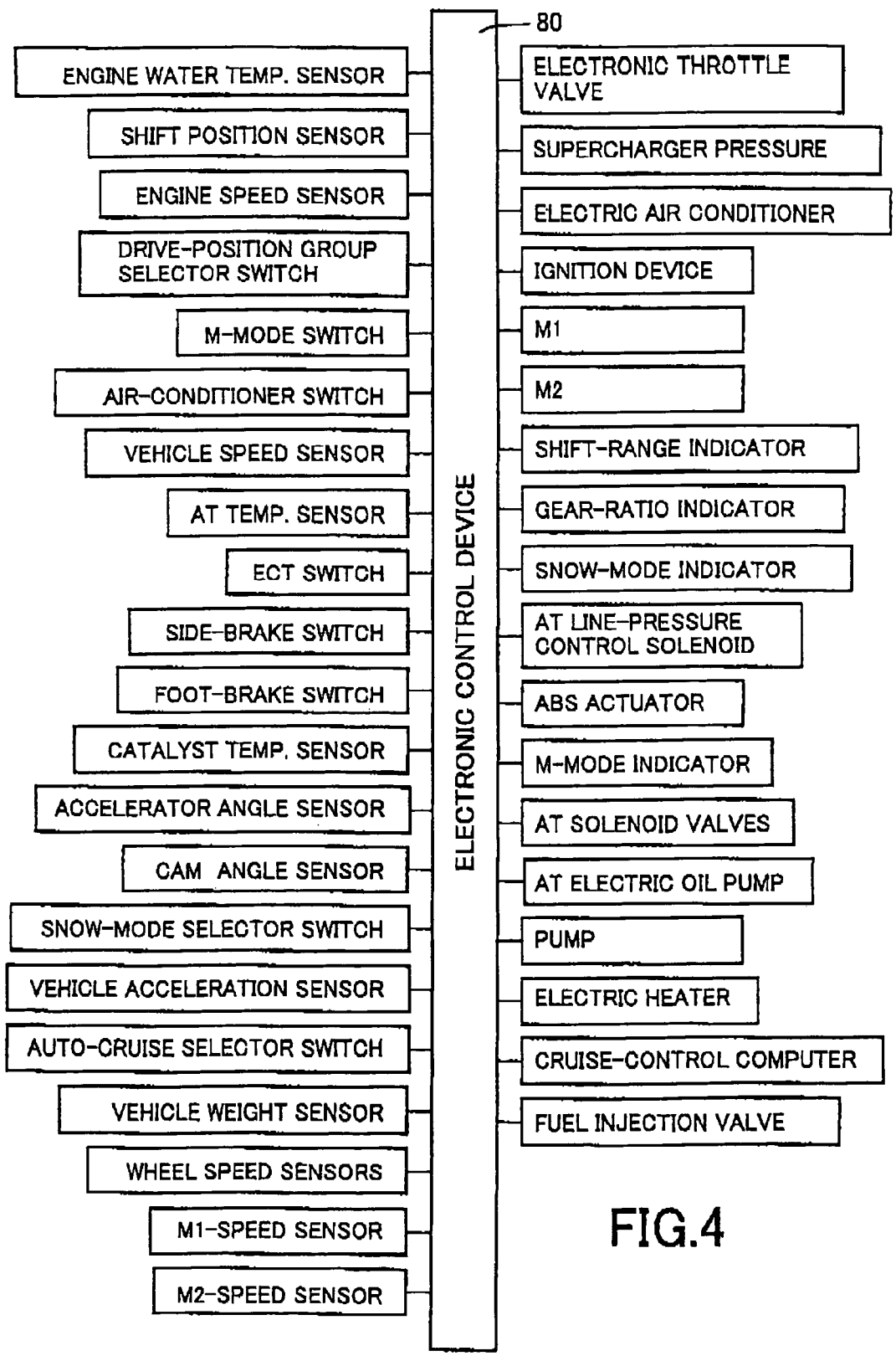
FIG. 4 is a view showing an electronic control unit with input and output signals associated therewith which is provided in the vehicular drive apparatus shown in FIG. 1.

FIG. 4 shows an electronic control unit 80 operative to control the transmission mechanism 10 of the present invention for generating various output signals in response to various input signals. The electronic control unit 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control unit 80, connected to various sensors and switches as shown in FIG. 4, receives various signals such as: a signal indicative of an engine coolant temperature $TEMP_W$; a signal indicative of a shift position $P_{SH}$ selected with a shift lever 52 (shown in FIG. 6) and a signal indicative of the number of operations initiated on the "M" position; a signal indicative of the engine speed $N_E$ representing the rotational speed of the engine 8; a signal indicative of a gear train preset value; a signal commanding an M mode (manual shift running mode); a signal indicative of an operated state of an air conditioner; a signal indicative of the rotational speed (hereinafter referred to as "output shaft speed") $N_{OUT}$ of the output shaft 22; a signal indicative of a temperature $T_{OIL}$ of working oil of the automatic transmission portion 20.

Figure 7:
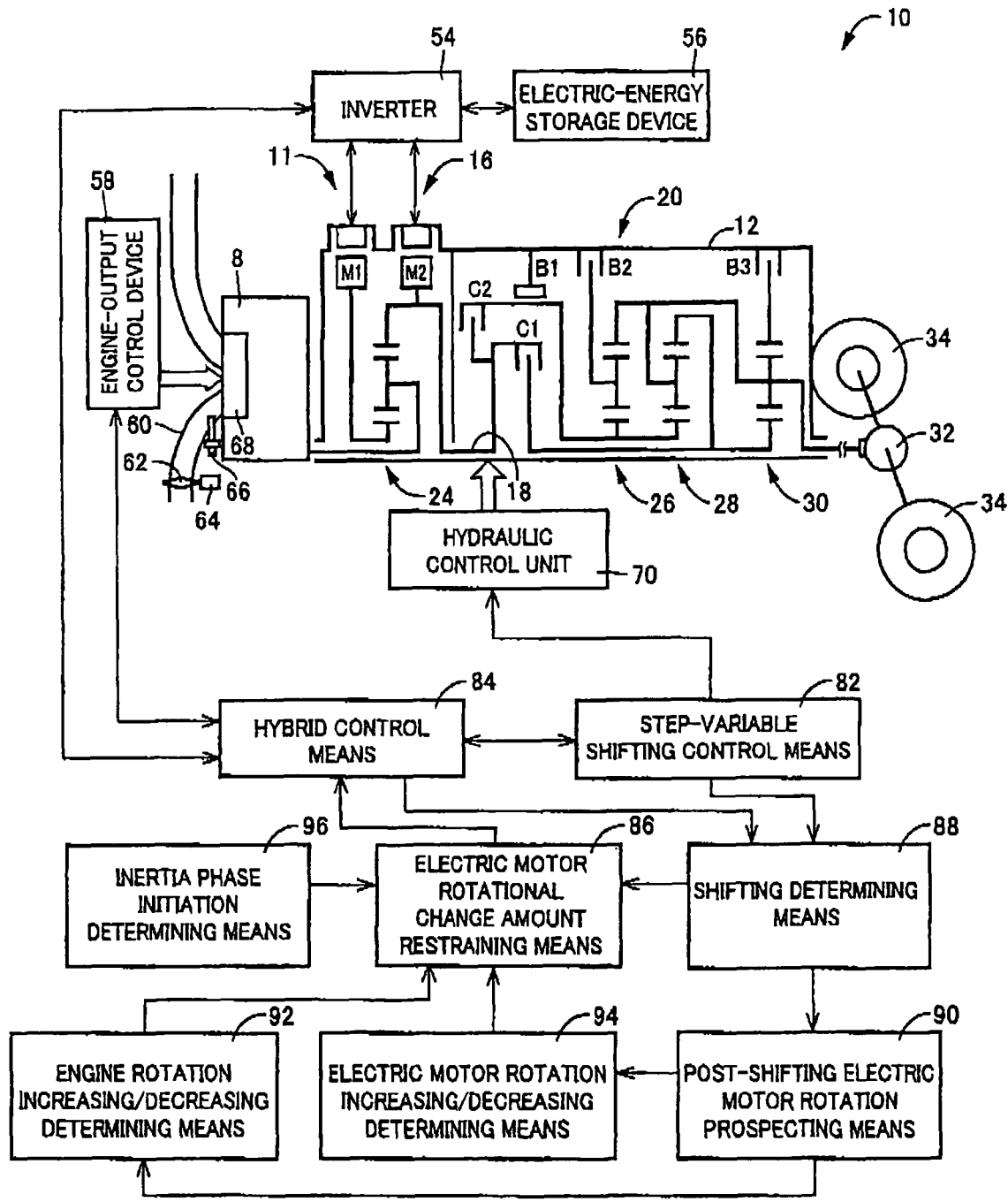
FIG. 7 is a functional block diagram illustrating a major control function of an electronic control unit of FIG. 4.

The electronic control unit 80 also receives a signal indicative of a side brake under operation; a signal indicative of a foot brake under operation; a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a weight vehicle weight) of the vehicle; a signal indicative of a wheel velocity of each drive wheel; a signal indicative of a rotational speed $N_{M1}$ of the first electric motor M1 (hereinafter referred to as "first-electric motor speed $N_{M1}$"); a signal indicative of a rotational speed $N_{M2}$ of the second electric motor M2 (hereinafter referred to as "second-electric motor speed $N_{M2}$"); and a signal indicative of a state of charge SOC stored in an electric-energy storage device 60 (see FIG. 7).

The electronic control unit 80 generates various signals including: a control signal applied to an engine output control device 58 (see FIG. 7) for controlling an engine output, i.e., a drive signal applied to a throttle actuator 64 for controlling a throttle valve opening $\theta_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air conditioner; command signals for commanding the operations of the first and second electric motors M1 and M2; a shift-position (manipulated position) display signal for actuating a shift-range indicator; a gear-ratio indicating signal for displaying the gear ratio.

The electronic control unit 80 also generates snow-mode display signal for displaying the presence of a snow-mode; an ABS actuation signal for operating an ABS actuator to preclude slippages of the drive wheels during a braking phase; an M-mode display signal for displaying an M-mode being selected; valve command signals for actuating electromagnetic valves (linear solenoid valves), incorporated in the hydraulic control unit 70 (see FIGS. 5 and 7) for controlling the hydraulic actuators of the hydraulically operated frictional coupling devices of the differential portion 11 and automatic transmission portion 20; a signal for regulating a regulator valve (pressure regulator valve), incorporated in the hydraulic control unit 70, to regulate a line pressure PL; a drive command signal for actuating an electric hydraulic pump acting as a hydraulic original-pressure source for the line pressure $P_L$ to be regulated; a signal for driving an electric heater; and a signal applied to a cruise-control computer.

Figure 5:
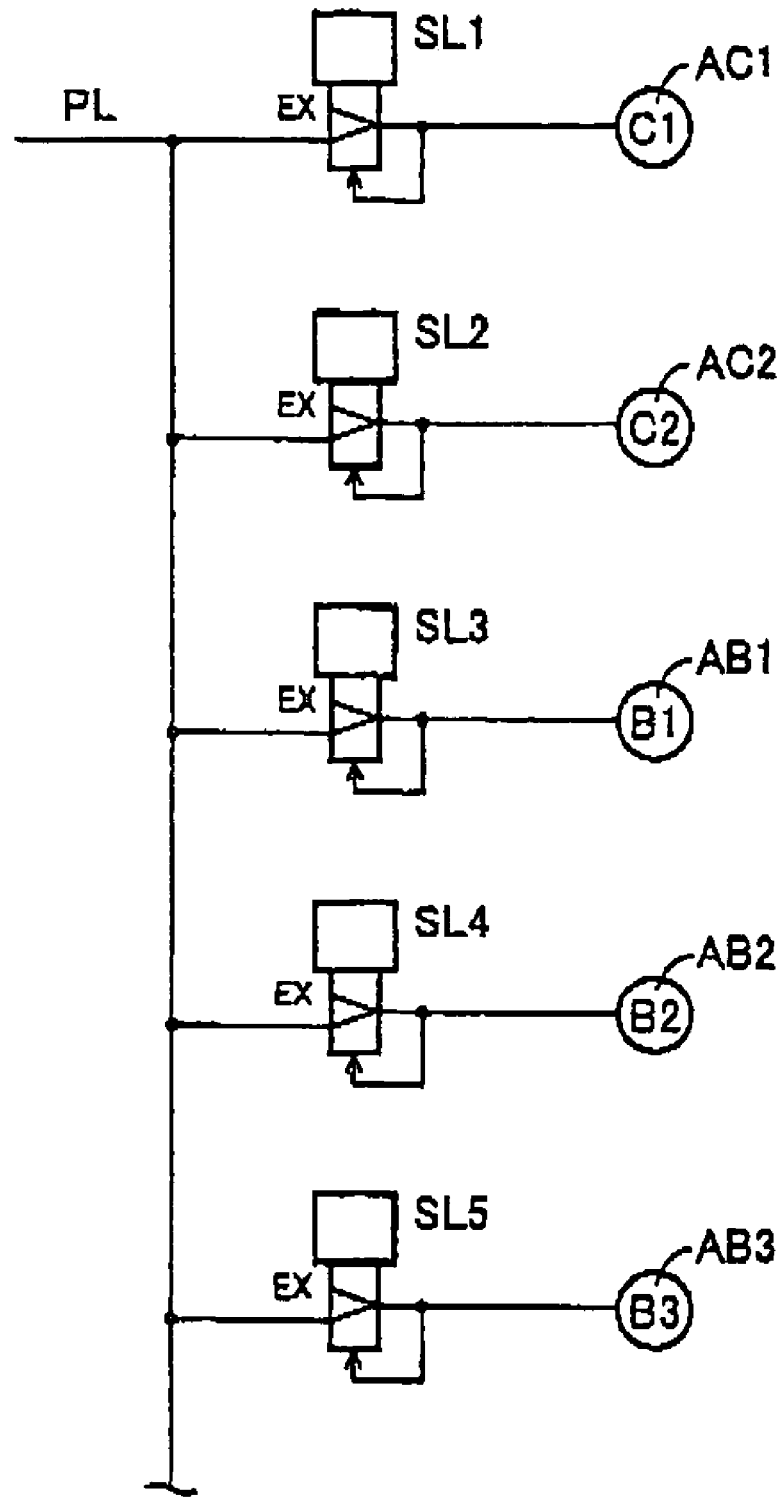
FIG. 5 is a circuit diagram showing a major portion of a hydraulic control circuit associated with linear solenoid valves arranged to control operations of respective hydraulic actuators of clutches C and brakes B.

FIG. 5 is a circuit diagram related to linear solenoid valves SL1 to SL5 of the hydraulic control circuit 70 for controlling the operations of respective hydraulic actuators (hydraulic cylinders) AC1, AC2, AB1, AB2, AB3 of the clutches C1, C2 and brakes B1 to B3.

As shown in FIG. 5, the hydraulic actuators AC1, AC2, AB1, AB2; AB3 are connected to the respective linear solenoid valves SL1-SL5, which are controlled in response to control commands, delivered from the electronic control unit 80. This adjusts the line pressure PL into respective clutch engaging pressures PC1, PC2, PB1, PB2 and PB3 to be applied directly to the respective hydraulic actuators AC1, AC2, AB1, AB2, AB3. The line pressure PL represents an original hydraulic pressure, generated by an electrically operated hydraulic oil pump (not shown) or a mechanical oil pump driven by the engine 30, which is regulated by a relief-type pressure regulator valve depending on a load of the engine 8 in terms of an accelerator opening displacement $A_{CC}$ or a throttle valve opening $\theta_{TH}$.

The linear solenoid valves SL1 to SL5, fundamentally formed in the same structure, are independently energized or de-energized with the electronic control unit 80. This allows the hydraulic actuators AC1, AC2, AB1, AB2, AB3 to independently and controllably regulate hydraulic pressures, thereby controlling the clutch engaging pressures PC1, PC2, PB1, PB2, PB3. With the automatic transmission portion 20, predetermined coupling devices are coupled in a pattern indicated on, for instance, the coupling-operation indicating table shown in FIG. 2, thereby establishing various gear positions. In addition, during the shifting control of the automatic transmission portion 20, a so-called clutch-to-clutch shifting is executed to simultaneously control the coupling or uncoupling of the clutches C and the brakes B relevant to the shifting operations.

Figure 6:
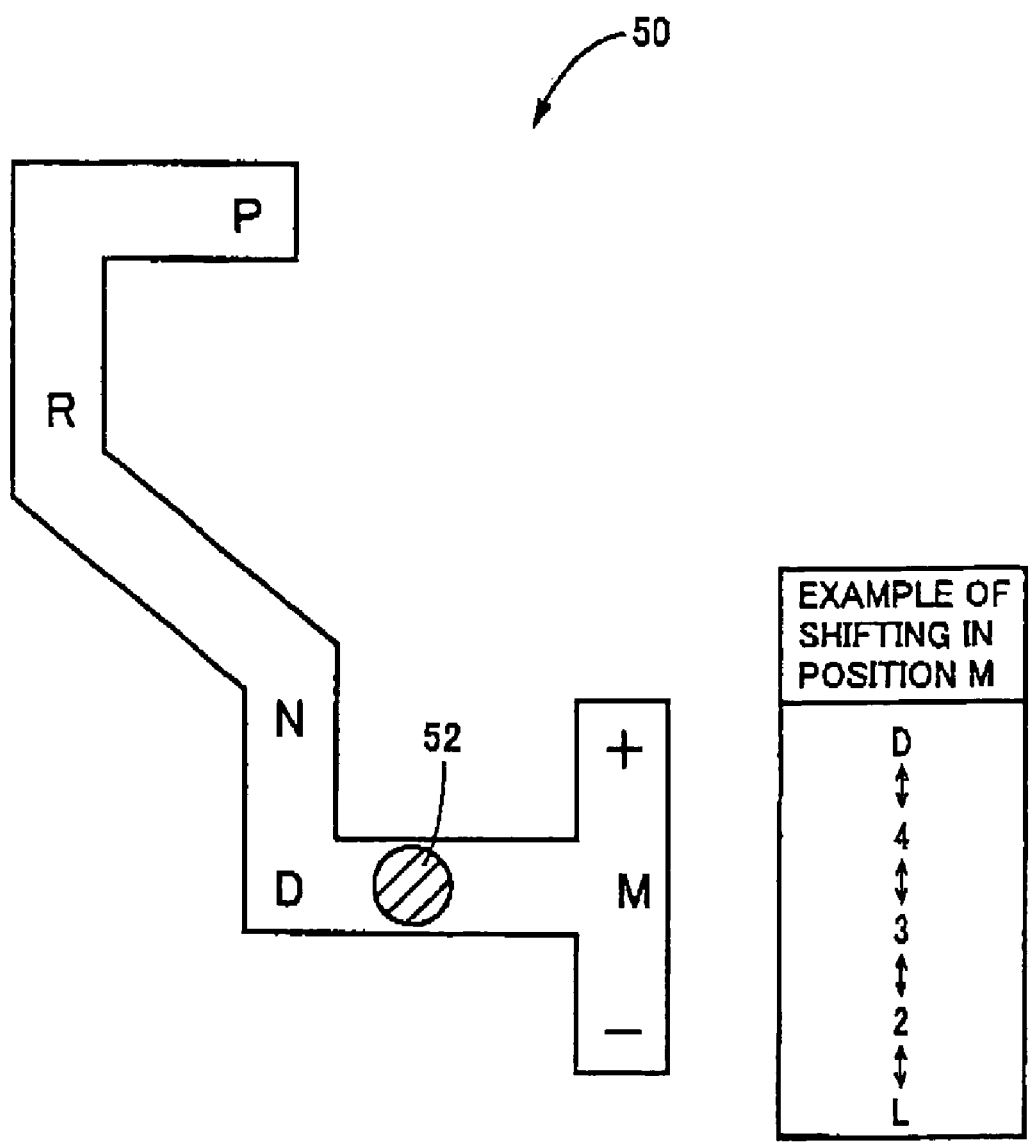
FIG. 6 is a view showing one example of a manually operated shifting device including a shift lever and operable to select one of a plurality of shift positions of multiple kinds.

FIG. 6 is a view showing one example of a manually operated shifting device 50 serving as a changeover device operative to shift multiple kinds of shift positions $P_{SH}$ on manual operation. The shifting device 50 is mounted in, for instance, an area lateral to a driver's seat and includes a shift lever 52 to be manipulated for selecting one of the plurality of shift positions $P_{SH}$.

The shift lever 52 has a parking position "P" (Parking) under which an inside of the transmission mechanism 10, i.e., the power transmitting path inside the automatic transmission portion 20 is shut off in a neutral condition, i.e., a neutral state with the output shaft 22 of the automatic transmission portion 20 remained in a locked state; a reverse drive position "R" (Reverse) for a reverse drive mode; a neutral position "N" (Neutral) for the power transmitting path of the transmission mechanism 10 to be shut off in the neutral state; an automatic forward-drive running position "D" (Drive); and a manual-shift forward-drive position "M" (Manual). In the automatic forward-drive running position "D", an automatic shift mode is established for executing an automatic shift control within a varying range of a shiftable total speed ratio γT of the transmission mechanism 10 resulting from various gear positions whose automatic shift control is performed in a continuously variable speed ratio width of the differential portion 11 and a range of the 1st-speed to the 4th-speed gear positions of the automatic transmission portion 20. The manual-shift forward-drive position "M" is manually shifted to establish a manual-shift forward-drive mode (manual mode) for setting a so-called shift range to limit a shifting gear position on a high speed range during the operation of the automatic transmission portion 20 under the automatic shift control.

As the shift lever 52 is shifted to the various shift positions $P_{SH}$, the hydraulic control circuit 70 is electrically switched, thereby obtaining the reverse-drive "R" gear position, the neutral position "N" and the various gear shift positions or the like in the forward-drive gear position "D".

Among the various shift positions $P_{SH}$ represented in the "P" to "M" positions, the "P" and "N" positions represent non-running positions selected when no vehicle is caused to run. That is, the "P" and "N" positions represent non-drive positions selected when the first and second clutches C1, C2 select to cause the power transmitting path to be switched to a power cut-off state like a situation where as indicated in, for instance, the coupling operation indicating table shown in FIG. 2, both the first and second clutches C1, C2 are uncoupled to interrupt the power transmitting path inside the automatic transmission portion 20 so as to disenable the driving of the vehicle.

The "R", "D" and "M" positions represent running positions selected when the vehicle is caused to run. That is, these positions represent drive positions selected when the first and/or second clutches C1, C2 select to cause the power transmitting path to be switched to a power transmitting state like a situation where as indicated in, for instance, the coupling operation indicating table shown in FIG. 2, at least one of the first and second clutches C1, C2 is coupled to establish the power transmitting path inside the automatic transmission portion 20 so as to enable the vehicle to be driven.

More particularly, as the shift lever 52 is manually shifted from the "P" position or the "N" position to the "R" position, the second clutch C2 is coupled to cause the power transmitting path of the automatic transmission portion 20 to be switched from the power cut-off state to the power transmitting state. With the shift lever 52 manually shifted from the "N" position to the "D" position, at least the first clutch C1 is coupled to switch the power transmitting path of the automatic transmission portion 20 from the power cut-off state to the power transmitting state. Further, as the shift lever 52 is manually shifted from the "R" position to the "P" or "N" position, the second clutch C2 is uncoupled to switch the power transmitting path of the automatic transmission portion 20 from the power transmitting state to the power cut-off state. With the shift lever 52 manually shifted from the "D" position to the "N" position, the first clutch C1 or second clutch C2 is uncoupled to switch the power transmitting path of the automatic transmission portion 20 from the power transmitting state to the power cut-off state.

FIG. 7 is a functional block diagram illustrating major control functions to be executed by the electronic control unit 80. Step-variable shifting control means 82 determines a shift demand to the automatic transmission portion 20 based on the output shaft rotational-speed relevant value and a driver's request to cause the automatic transmission portion to execute the automatic shift control so as to obtain a demanded shift position in response to the shift demand. For instance, the step-variable shifting control means 82 determines whether to execute the shifting of the automatic transmission portion 20, i.e., the gear position to be shifted for causing the automatic transmission portion to execute the automatic shift control, based on the vehicle condition, represented by an actual vehicle speed V and the accelerator opening Acc by referring to the relationships (shifting lines and shifting map) involving upshift lines (in solid lines) and downshift lines (in single dot lines) that are preliminarily stored as parameters of the vehicle speed V and the accelerator opening Acc represented in FIG. 8.

When this takes place, the step-variable shifting control means 82 outputs commands (a shift output command and a hydraulic pressure command) to the hydraulic control circuit 70 for coupling and/or uncoupling the hydraulically operated frictional coupling devices, involved in the shifting of the automatic transmission portion 20 so as to establish the gear position in accordance with the coupling table shown in FIG. 2. That is, the step-variable shifting control means 82 outputs a command to the hydraulic control circuit 70 for uncoupling the on-uncoupling coupling device, involved in the shifting, while coupling the on-coupling coupling device to cause the clutch-to-clutch shifting to be executed. Upon receipt of such commands, the hydraulic control circuit 70 causes the linear solenoid valves SL of the automatic transmission portion 20 to be actuated. This allows the hydraulically operated actuators of the hydraulically operated frictional coupling devices, involved in the relevant shifting, to be actuated. Thus, for instance, the on-uncoupling coupling device is uncoupled and the on-coupling coupling device is coupled, causing the automatic transmission portion 20 to execute the shifting.

Hybrid control means 84 operates the engine 8 in an optimum operating range at a high efficiency while distributing the drive forces of the engine 8 and the second electric motor M2 at optimum rates and optimally varying a reacting force of the first electric motor M1 during the operation thereof to generate electric power, thereby controllably operating the differential portion 11 under an electrically controlled continuously variable transmission to control a speed ratio $\gamma 0$. At a vehicle speed V during the running of the vehicle in one occasion, for instance, a target (demanded) output for the vehicle is calculated based on the accelerator opening Acc and the vehicle speed V both of which represent output demanded variables of the driver, after which a demanded total target output is calculated based on the target output of the vehicle and a battery charge demanded value. Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power being generated by the first electric motor M1, so as to obtain the engine speed $N_E$ and engine torque $T_E$ such that the target engine output is obtained.

The hybrid control means 84 executes such controls in consideration of, for instance, the gear position of the automatic transmission portion 20 with a view to increasing a dynamic performance and improving fuel consumption. During such hybrid controls, the differential portion 11 is caused to operate as the electrically controlled continuously variable transmission such that the engine speed $N_E$ and the vehicle speed V, determined for the engine 8 to operate in the operating range at a high efficiency, match the vehicle speed and the rotational speed of the power transmitting member 18 determined with the gear position in the automatic transmission portion 20.

Figure 9:
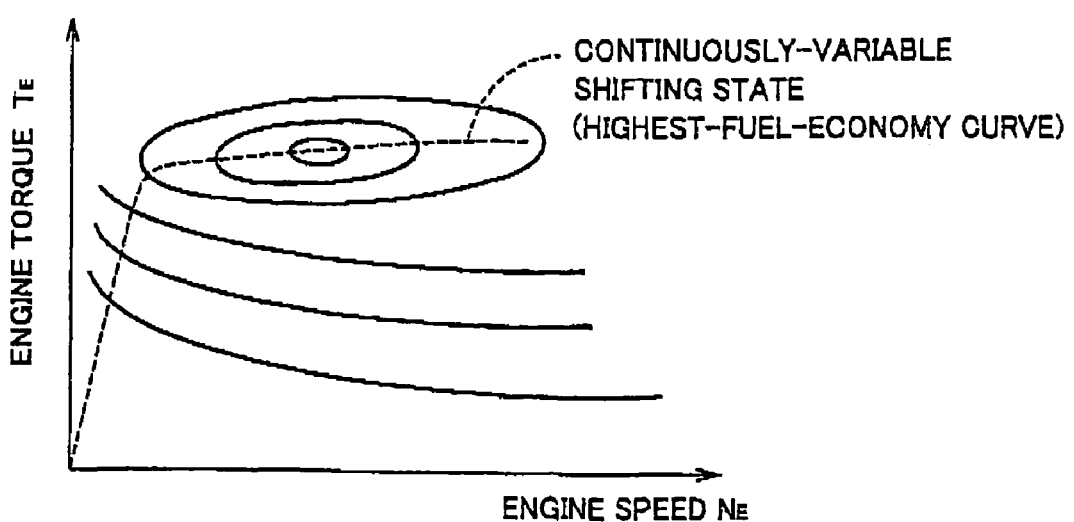
FIG. 9 is a view illustrating one example showing a fuel consumption map with a broken line representing an optimum fuel consumption curve of an engine.

That is, the hybrid control means 84 determines a target value of the total speed ratio $\gamma T$ of the transmission mechanism 10 such that the engine 8 is caused to operate along an optimal fuel efficiency curve (a fuel efficiency map and the relationships) of the engine 8 as indicated by a dotted line in FIG. 9 which is preliminarily and experimentally obtained and prestored. This achieves a compromise between driveability and fuel consumption during the running of the vehicle under a continuously variable shifting mode on a two-dimensional coordinate established with the engine speed $N_E$ and output torque (engine torque) $T_E$ of the engine 8. For instance, the target value of the total speed ratio $\gamma T$ of the transmission mechanism 10 is determined so as to obtain engine torque $T_E$ and the engine speed $N_E$ for generating the engine output demanded for satisfying target outputs (a total target output and demanded drive torque). Then, the speed ratio $\gamma 0$ of the differential portion 11 is controlled in consideration of the gear position in the automatic transmission portion 20 so as to obtain the relevant target value, thereby controlling the total speed ratio $\gamma T$ within a continuously variable shifting range.

When this takes place, the hybrid control means 84 allows electric energy, generated by the first electric motor M1, to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipment, involved in the operations starting from the step of generating electric power to the step of causing the second electric motor M2 to consume resultant electric energy, establishes an electric path in which the part of the drive power of the engine 8 is converted into electric energy and resultant electric energy is converted into mechanical energy.

The hybrid control means 84 allows the differential portion 11 to perform an electrically controlled CVT function for controlling, for instance, a first-electric-motor rotational speed $N_{M1}$ to maintain the engine speed $N_E$ at a nearly constant level or to control the rotational speed at an arbitrary level regardless of the vehicle remaining under a halted condition or a running condition. In other words, the hybrid control means 84 controls the first-electric-motor rotational speed $N_{M1}$ at an arbitrary level while maintaining the engine speed $N_E$ at the nearly constant level or the arbitrary rotational speed.

As will be apparent from the collinear chart shown in FIG. 3, for instance, when raising the engine speed $N_E$ during the running of the vehicle, the hybrid control means 84 raises the first-electric-motor rotational speed $N_{M1}$ while maintaining a second-electric-motor rotational speed $N_{M2}$ at a nearly fixed level that is bound with the vehicle speed V (represented by the drive wheels 34). In addition, when maintaining the engine speed $N_E$ at the nearly fixed level during the shifting of the automatic transmission portion 20, the hybrid control means 84 varies the first-electric-motor rotational speed $N_{M1}$ in a direction opposite to that in which the second-electric-motor rotational speed $N_{M2}$ varies with the shifting of the automatic transmission portion 20 while maintaining the engine speed $N_E$ at the nearly fixed level.

The hybrid control means 84 causes the throttle actuator 64 to controllably open or close the electronic throttle valve 62 for performing a throttle control. In addition, the hybrid control means 84 functionally includes engine output control means that outputs commands to an engine output control device 58 singly or in combination. This causes a fuel injection device 66 to control a fuel injection quantity and a fuel injection timing for fuel injection control while causing an ignition device 68 to control an ignition timing of an ignition device 68 such as an igniter or the like for an ignition timing control. Upon receipt of such commands, the engine output control device 58 executes an output control of the engine 8 so as to provide a demanded engine output.

For instance, the hybrid control means 84 basically drives the throttle actuator 60 in response to the accelerator opening Acc by referring to the prestored relationship (not shown). The throttle control is executed such that the greater the accelerator opening Acc, the larger will be the throttle valve opening $\theta_{TH}$. Upon receipt of the commands from the hybrid control means 84, further, the engine output control device 58 allows the throttle actuator 64 to controllably open or close the electronic throttle valve 62 for throttle control while controlling the ignition timing of the ignition device 68 such as the igniter or the like for ignition timing control, thereby executing an engine torque control.

Further, the hybrid control means 84 is operative to cause the differential portion 11 to perform the electrically controlled CVT function (differential action) to achieve the motor drive mode regardless of the engine 8 remaining under the halted condition or an idling state.

Figure 8:
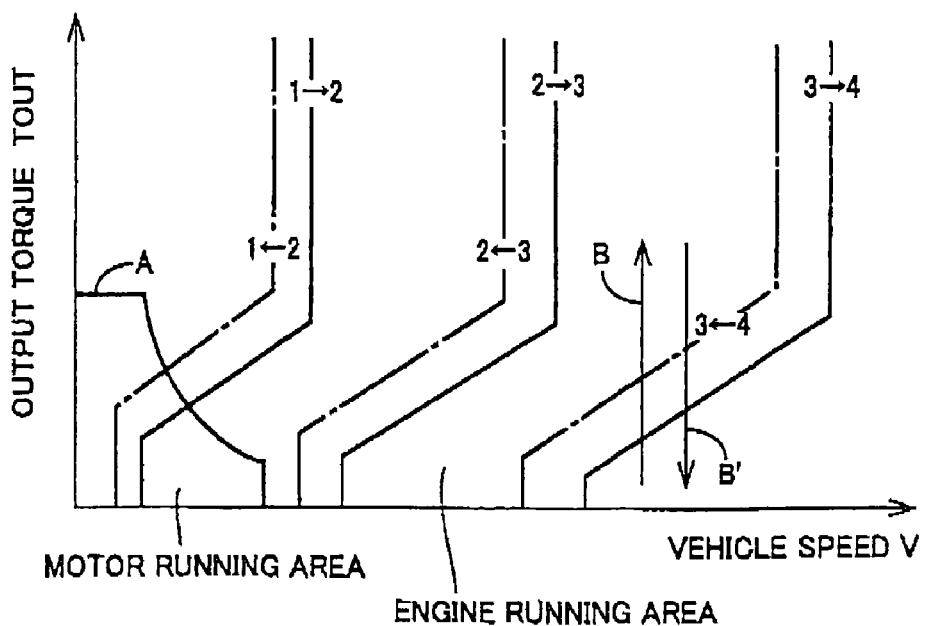
FIG. 8 is a view illustrating one example of a shifting map for use in performing a shifting control of the drive apparatus and one example of drive-power-source map defining boundary lines for use in a drive-power-source switching control between an engine-drive mode and a motor-drive mode with those maps being related to each other.

For instance, the hybrid control means 84 determines whether the vehicle remains in the motor-drive running region or the engine-drive running region based on the vehicle condition, represented by the actual vehicle speed V and the accelerator opening Acc, by referring to the relationship (drive-power-source switching lines and drive-power-source map) shown in FIG. 8 for thereby executing either a motor-drive running mode or an engine-drive running mode. The relationship, shown in FIG. 8, has boundary lines, prestored as parameters involving the vehicle speed V and the accelerator opening Acc, between the motor-drive running region and the engine-drive running region for switching a running drive-power source between the engine 8 and the second electric motor M2. The drive-power-source map A, shown by a solid line in FIG. 8, is prestored together with a shifting map represented by, for instance, solid lines and single dot lines. As will be apparent from FIG. 8, the hybrid control means 84 executes the motor-drive running mode in a relatively low output torque range $T_{OUT}$, regarded to be generally lower in engine efficiency than that of the engine operating in a high output torque range, i.e., a low accelerator opening Acc representing a low engine torque Te range or a relatively low vehicle speed range of the vehicle speed V, i.e., a low load range.

In order to suppress a drag of the engine 8 being halted for improving fuel consumption during such a motor-drive running mode, the hybrid control means 84 controls the first-electric-motor rotational speed $N_{M1}$ in a negative rotational speed to render, for instance, the first electric motor operative under an unloaded condition, thereby achieving an idling state. By so doing, the engine speed $N_E$ is zeroed or nearly zeroed depending on needs due to the electrically controlled CVT function (differential action) of the differential portion 11.

Even if the engine-drive running region is present, the hybrid control means 84 allows the first electric motor M1 and/or the battery device 56 to supply electric energy to the second electric motor M2 using the electrical path mentioned above. This drives the second electric motor M2 to apply torque to the drive wheels 34, making it possible to provide a so-called torque-assist for assisting drive power of the engine 8.

The hybrid control means 84 renders the first electric motor M1 operative under the unloaded condition to freely rotate in the idling state. This makes it possible to cause the differential portion 11 to interrupt a torque transfer; i.e., the differential portion 11 is rendered inoperative with no output being provided under the same state as that in which the power transmitting path is disconnected in the differential portion 11. That is, the hybrid control means 84 places the first electric motor M1 in the unloaded condition, making it possible to place the differential portion 11 in a neutral condition (neutral state) in which the power transmitting path is electrically disconnected.

Now, as described above, the hybrid control means 84 operates to shift the differential portion 11 in consideration of the gear stage of the automatic transmission portion 20 so that the target value of the total speed ratio $\gamma T$ of the transmission mechanism i.e., shifting mechanism 10 can continuously variably obtained. For example, as shown by an arrow B of FIG. 8, when the required output torque TOUT is increased by the depression operation of the accelerator pedal, a 4th→3rd power-on downshift of the automatic transmission portion 20 by the step-variable shift control means 82 and a downshift of the differential portion 11 by the hybrid control means 84 are often overlapped in shifting periods thereof. Alternatively, for example, as shown by an arrow B' of FIG. 8, when the required output torque TOUT is reduced by the return operation of the accelerator pedal, a 3rd→4th up-shift of the automatic transmission portion 20 by the step-variable shift control means 82 and the up-shift of the differential portion 11 by the hybrid control means 84 are often overlapped in shifting periods thereof.

Figure 15:
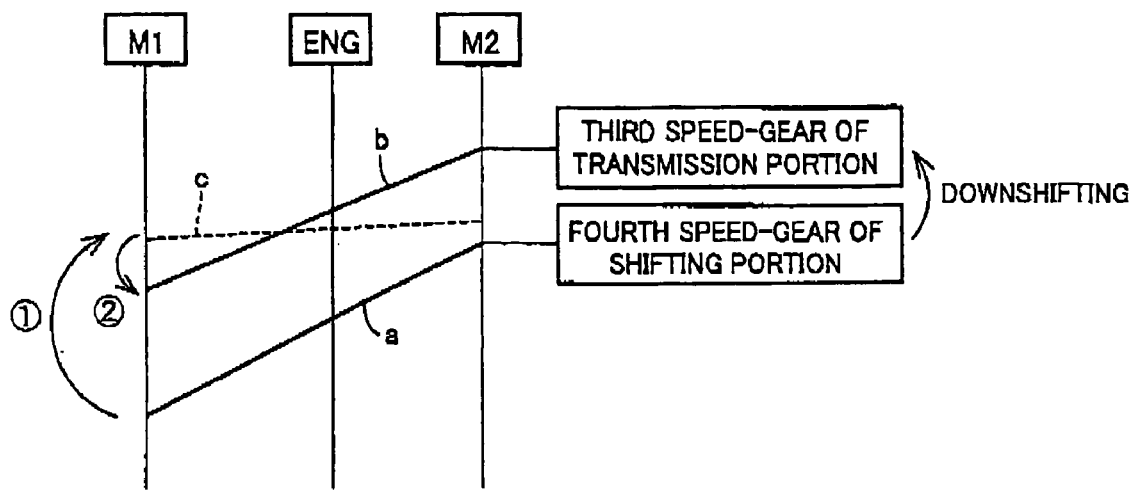
FIG. 15 is a well known collinear chart showing the rotational speed of each rotational element constructing the differential portion, and represents in the collinear chart an example of the rotational change of each rotational element upon the overlapping downshifts in the differential portion and the transmission portion.

Then, for example, as shown in FIG. 15, the power-on downshift of the automatic transmission portion 20 and the downshift of the differential portion 11 are executed in the overlapped way in shifting periods, so that the relative relation change from a solid line "a" to a solid line b. In this changing process, a first electric motor rotational speed NM1 once increased by the shifting of the differential portion 11 is lowered by the rotational change of a second electric motor rotational speed NM2 during the inertia phase in the shifting of the automatic transmission portion 20. This likely causes an unnecessary rotational change of the first electric motor rotational speed NM1. Here, while the case of the both downshifts being overlapped in shifting periods is illustrated, even when the automatic transmission portion 20 and the differential portion 11 are up-shifted in an overlapping way in the shifting periods thereof, the unnecessary rotational change of the first electric motor rotational speed NM1 is likely to occur. However, the direction of each rotational change is reversed to that of the downshift.

Hence, in the present embodiment, electric motor rotational change amount restraining means 86 for controlling the first electric motor M1 is provided, when the differential portion 11 and the automatic transmission portion 20 execute the shifting in the overlapping way in the shifting periods, to restrain the change amount of the first electric motor rotational speed NM1 before and after the shifting.

Specifically, shifting determining means 88 determines whether the transmission mechanism 10 is in a process of the shifting, that is, whether the differential portion 11 and the automatic transmission portion 20 execute the shifting in the overlapping way in the shifting periods. For example, the shifting determining means 88 determines the simultaneous shifting based on the shifting determination of the automatic transmission portion 20 by the step-variable shift control means 82, and based on whether the shifting of the differential portion 11 is executed by the hybrid control means 84 so as to obtain the target value of the total speed ratio γT of the transmission mechanism 10.

When the shifting determining means 88 determines the transmission mechanism 10 is in a process of the shifting, the post-shifting electric motor rotation prospecting means 90 calculates a post-shifting prospected value (hereinafter, referred to as "post-shifting prospected first electric motor rotational speed") NM1P of the first electric motor rotational speed NM1, based on an estimated value (hereinafter, referred to as "post-shifting estimated transmitting member rotational speed") N18P of the transmitting member rotational speed N18 (that is, the second electric motor rational speed NM2) of the transmission mechanism 10, and an estimated value (hereinafter, referred to as "post-shifting estimated target engine rotational speed) NEtP of the target engine rotational speed NEt after the shifting of the transmission mechanism 10.

For example, the post-shifting electric motor rotation prospecting means 90 operates as follows. First, the post-shifting estimated transmitting member rotational speed N18P (=output shaft rotational speed NOUT×speed ratio γ after shifting) is calculated using the output shaft rotational speed NOUT and the speed ratio γ corresponding to the gear stage after the shifting of the automatic transmission portion 20. Next, the post-shifting estimated target engine rotational speed NEtP (=output shaft rotational speed NOUT×total speed ratio γT after shifting) is calculated from the output shaft rotational speed NOUT and the target value of the total speed ratio γT after the shifting of the transmission mechanism 10. The post-shifting prospected first electric motor rotational speed NM1P is calculated based on the post-shifting estimated transmitting member rotational speed N18P after the shifting and the post-shifting estimated target engine rotational speed NEtP using the mutually relative rotational speed among the transmitting member rotational speed N18, the engine rotational speed NE, and the first electric motor rotational speed NM1 in the differential portion 11.

The transmitting member rotational speed N18 has its estimated value (=output shaft rotational speed NOUT×the speed ratio γ) calculated as required using the output shaft rotational speed NOUT and the speed ratio γ corresponding to the gear stage of the automatic transmission portion 20. Further, the target engine rotational speed NEt has its estimated value (=output shaft rotational speed NOUT×total speed ratio γT) calculated as required using the output shaft rotational speed NOUT and the total speed ratio γT of the transmission mechanism 10. Using the mutually relative rotational speed in the differential portion 11, the estimated value of a target first electric motor rotational speed NM1t is calculated, based on the estimated value of the transmitting member rotational speed N18 and the estimated value of the target engine rotational speed NEt. Particularly, the estimated value of the target first electric motor rotational speed NM1t after shifting is the post-shifting prospected first electric motor rotational speed NM1P.

The electric motor rotational change amount restraining means 86 controls the first electric motor M1 based on the post-shifting prospected first electric motor rotational speed NM1P calculated by the post-shifting electric motor rotation prospecting means 90. For example, the electric motor rotational change amount restraining means 86 outputs a command for changing the first electric motor rotational speed NM1 towards the post-shifting prospected first electric motor rotational speed NM1P to the hybrid control means 84. This is to avoid that the rotational change direction (increasing/decreasing direction) of the first electric motor rotation speed NM1 by the shifting of the differential portion 11 and the rotational change direction of the first electric motor rotational speed NM1 during the inertia phase by the shifting of the automatic transmission portion 20 are rendered opposite to each other. In other words, the electric motor rotational change amount restraining means 86 outputs the command to the hybrid control means 84 for controlling the first electric motor M1, to minimize the change amount of the first electric motor rotational speed NM1 before and after the shifting of the transmission mechanism 10.

Here, a start timing i.e., an initiation timing for changing the first electric motor rotational speed NM1 by the electric motor rotational change amount restraining means 86 will be studied below.

Before inertia phase initiation by the shifting of the automatic transmission portion 20, that is the inertia phase in the automatic transmission portion 20 by the shifting thereof, no rotational change occurs in the transmitting member rotational speed N18. Consequently, with the first electric motor rotational speed NM1 varied, the engine rotational speed NE is changed in the same increasing/decreasing direction as that of the first electric motor rotational speed NM1 by the differential operation of the differential portion 11. At this time, if the change direction of the first electric motor rotational speed NM1 towards the post-shifting prospected first electric motor rotational speed NM1P and the change direction of the engine rotational speed NE towards the estimated target engine rotational speed NEtP are the same with each other, no problem will occur. However, when the two change directions are different, the engine rotation speed NE is once changed towards the opposite direction from the post-shifting estimated target engine rotational speed NEtP.

In view of this, when two directions are the same with each other, the first electric motor rotational speed NM1, for example, is changed before an initiation of inertia phase i.e., an inertia phase initiation from the timing when the shifting determining means 88 determines the transmission mechanism 10 is in a process of the shifting. On the other hand, when two directions are different from each other, the first electric motor rotational speed NM1 is changed after the inertia phase initiation. For example, the first electric motor rotational speed NM1 is kept or held constant without change until initiation of the inertia phase.

After the inertia phase initiation by the shifting of the automatic transmission portion 20, the rotational change occurs in the transmitting member rotational speed N18, so that the engine rotational speed NE changes towards the post-shifting estimated target engine rotational speed NEtP. Consequently, regardless of whether two directions being the same or not, the first electric motor rotational speed NM1 is changed towards the post-shifting prospected first electric motor rotational speed NM1P.

Specifically, an engine rotation increasing/decreasing determining means 92 determines the increasing/decreasing direction of the engine rotational speed NE before and after the shifting of the transmission mechanism 10 based on the post-shifting estimated target engine rotational speed NEtP. For example, the engine rotation increasing/decreasing determining means 92 determines whether the engine rotational speeds NE before and after the shifting are oriented to the increasing direction, that is, whether the target engine rotational speed NEt increases, based on whether the post-shifting estimated target engine rotational speed NEtP is higher than the target engine rotational speed NEt (or the actual engine rotational speed NE) before the shifting.

An electric motor rotation increasing/decreasing determining means 94 determines the increasing/decreasing directions of the first electric motor rotational speed NM1 before and after the shifting of the transmission mechanism 10 based on the post-shifting prospected first electric motor rotational speed NM1P. For example, the electric motor rotation increasing/decreasing determining means 94 determines whether the first electric motor rotational speeds NM1 before and after the shifting are oriented to the increasing direction, that is, whether the target first electric motor rotational speed NM1t is increased, based on whether the post-shifting prospected first electric motor rotational speed NM1P is higher than the target first electric motor rotational speed NM1t (or the actual first electric motor rotational speed NM1) before the shifting.

Inertia phase initiation determining means 96 determines whether an inertia phase is actually initiated by the following manner. The determination, for example, is based on whether the change amount of the second electric motor rotational speed NM2 exceeds a predetermined rotational change amount experimentally determined and set in advance for determining the initiation of the inertia phase.

The electric motor rotational change amount restraining means 86 changes a start timing of changing the first electric motor rotational speed NM1 based on the determined content by the electric motor rotation increasing/decreasing determining means 94. That is, the determination, for example, is based on the increasing/decreasing direction of the first electric motor rotational speed NM1 before and after the shifting of the transmission mechanism 10, and the increasing/decreasing direction of the engine rotational speed NE before and after the shifting of the transmission mechanism 10 determined by the engine rotation increasing/decreasing determining means 92.

For example, the electric motor rotational change amount restraining means 86 changes the first electric motor rotational speed NM1 before initiating the inertia phase during the shifting of the automatic transmission portion 20, when the increasing/decreasing direction of the first electric motor rotational speed NM1 and the increasing/decreasing direction of the engine rotational speed NE are the same. For example, the electric motor rotational change amount restraining means 86 outputs to the hybrid control means 84 a command for starting gradual change of the first electric motor rotational speed NM1 so as to have a predetermined gradient experimentally determined and set in advance, after the shifting determining means 88 determines the process of the shifting of the transmission mechanism 10.

Meanwhile, when the increasing/decreasing direction of the first electric motor rotational speed NM1 and the increasing/decreasing direction of the engine rotational speed NE are different, the electric motor rotational change amount restraining means 86 holds the first electric motor rotational speed NM1 constant, until the inertia phase initiation in the automatic transmission portion 20 during the shifting thereof. For example, the electric motor rotational change amount restraining means 86 outputs to the hybrid control means 84 a command for maintaining the first electric motor rotational speed NM1 in the first electric motor rotational speed NM1 at the timing when the shifting determining means 88 determines the process of shifting. This output continues from a timing when the shifting determining means 88 determines the shifting process of the transmission mechanism 10, to a timing when the inertia phase initiation determining means 96 determines an actual initiation of the inertia phase Further, the electric motor rotational change amount restraining means 86 changes the first electric rotational speed NM1 depending on the change of the transmitting member rotational speed N18 (or the second electric motor rotational speed NM2) after initiating the inertia phase during the shifting of the automatic transmission portion 20. For example, the electric motor rotational change amount restraining means 86 outputs to the hybrid control means 84 a command for gradually changing the first electric motor rotational speed NM1 depending on a rate of change of the second electric motor rotational speed NM2 after the inertia phase initiation determining means 96 determines the actual initiation of the inertia phase. This output changes the first electric motor rotational speed NM1 from the first electric motor rotational speed NM1 upon determination of the inertia phase initiation by the inertia phase initiation determining means 96 during the inertia phase, towards the post-shifting prospected first electric motor rotational speed NM1P.

Figure 10:
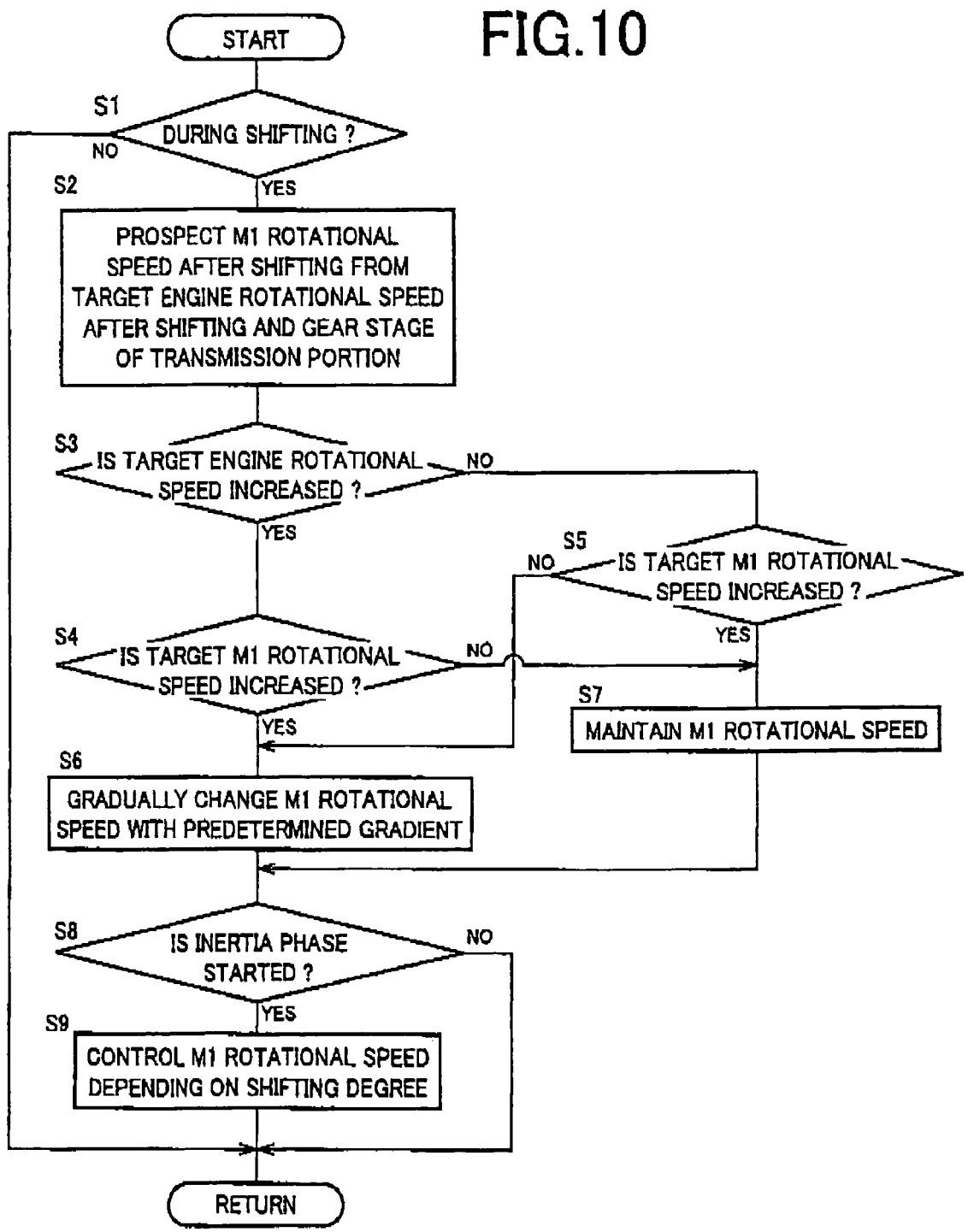
FIG. 10 is a flowchart explaining a control operation for restraining a control operation of an electronic control unit of FIG. 4, that is, an unnecessary rotational change of a first electric motor when a shifting in a differential portion and a shifting in a transmission portion are overlapped in shifting periods thereof.

FIG. 10 is a flowchart for explaining the major part of the control operation of an electronic control unit 80. The major part means a control operation for restraining the unnecessary rotational change of the first electric motor M1 when the differential portion 11 and the automatic transmission portion 20 execute the shiftings in the overlapping way in the shifting periods. This sequence, for example, is repeatedly executed at extremely short cycles of several msec to several tens msec.

Figure 11:
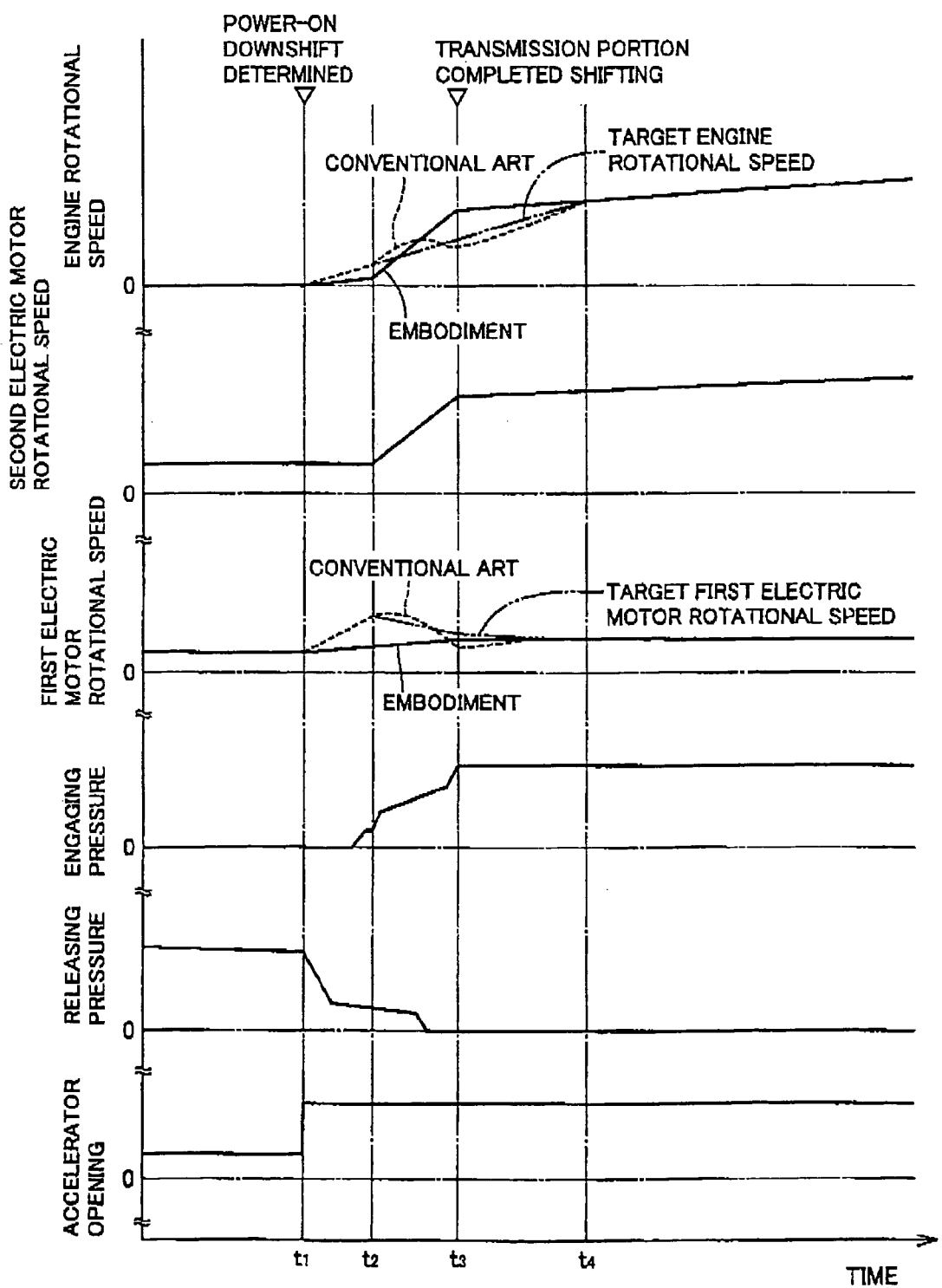
FIG. 11 is a time chart explaining the control operation shown in the flowchart of FIG. 10, and is an example in which the increasing/decreasing direction of the first electric motor rotational speed before and after the shifting and the increasing/decreasing direction of the engine rotational speed before and after the shifting upon the power-on downshift are the same.
Figure 12:
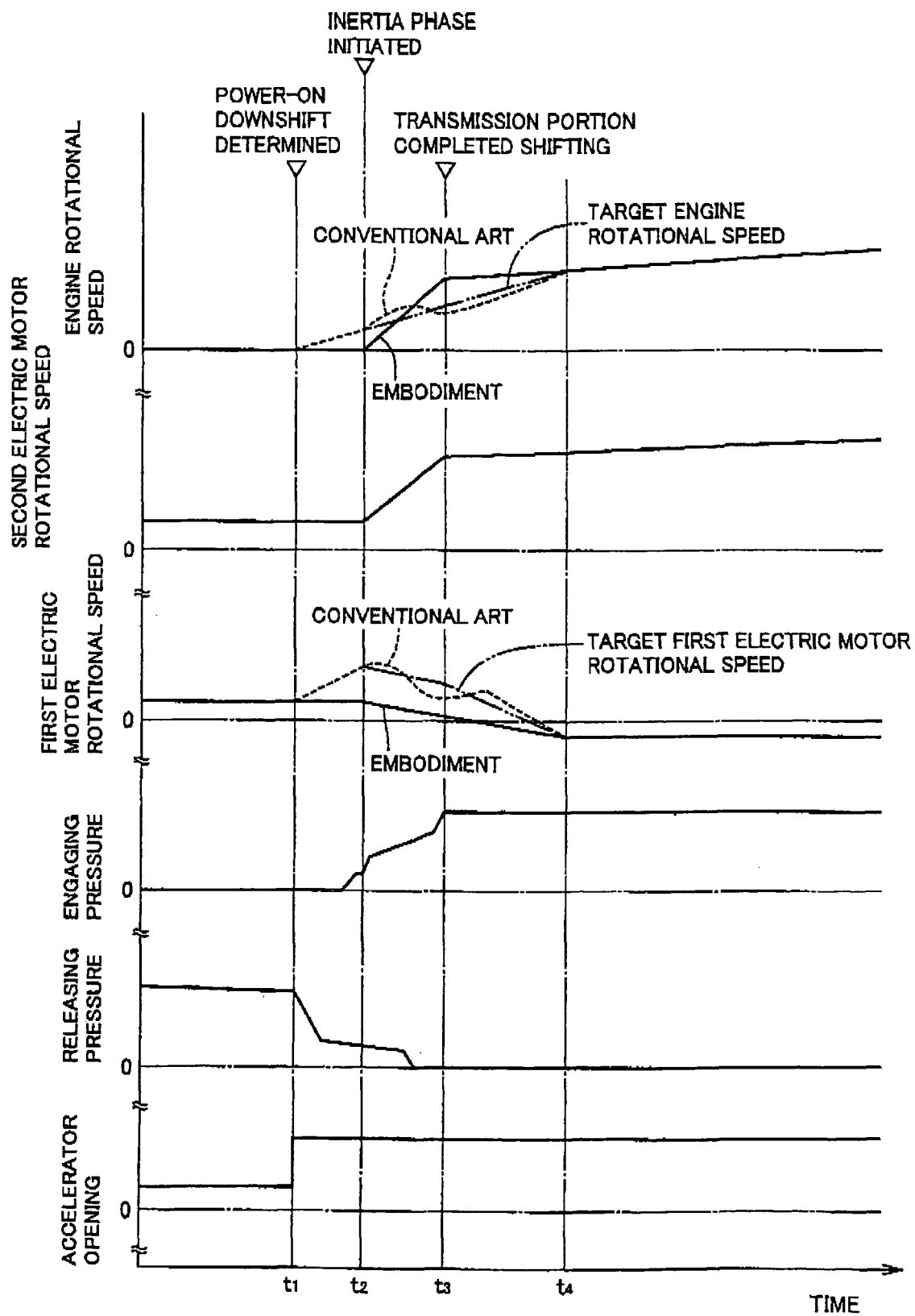
FIG. 12 is a time chart explaining the control operation shown in the flowchart of FIG. 10, and is an example in which the increasing/decreasing direction of the first electric motor rotational speed before and after the shifting and the increasing/decreasing direction of the engine rotational speed before and after the shifting upon the power-on downshift are different.

FIGS. 11 and 12 show time charts explaining the control operation shown in the flowchart of FIG. 10, respectively. FIG. 11 shows one example where the increasing/decreasing direction of the first electric motor rotational speed NM1 before and after the shifting, and the increasing/decreasing direction of the engine rotational speed NE before and after the shifting are the same, upon the power-on downshift by the depression operation of the accelerator pedal. FIG. 12 similarly shows one example where the increasing/decreasing direction of the first electric motor rotational speed NM1 before and after the shifting, and the increasing/decreasing direction of the engine rotational speed NE before and after the shifting are different, upon the power-on downshift.

In FIG. 10, first, at step (hereinafter, "step" will be omitted) S1 which corresponds to the shifting deciding means 88, it is determined whether the transmission mechanism 10 is in a process of the shifting, that is whether the differential portion 11 and the automatic transmission portion 20 execute the shifting in the overlapped in shifting periods.

When the determination at S1 is negated i.e., denied, the present routine is terminated. When the determination at S1 is affirmed, at S2 which corresponds to the post-shifting electric motor rotation prospecting means 90, the post-shifting estimated transmitting member rotational speed N18P is calculated using the output shaft rotational speed NOUT and the speed ratio γ corresponding to the gear stage after the shifting of the automatic transmission portion 20. Next, the post-shifting estimated target engine rotational speed NEtP is calculated using the output shaft rotational speed NOUT and the total speed ratio γT after the shifting of the transmission mechanism 10. Thereby, the post-shifting prospected first electric motor rotational speed NM1P is calculated using the mutual relative rotational speeds in the differential portion 11 among the transmitting member rotational speed N18, the engine rotational speed NE, and the first electric motor rotational speed NM1, based on the post-shifting estimated transmitting member rotational speed N18P and the estimated target engine rotational speed NetP after shifting.

Subsequently, at S3 which corresponds to the engine rotation increasing/decreasing determining means 92, it is determined whether the target engine rotational speed NEt increases. The determination is, for example, performed based on whether the post-shifting estimated target engine rotational speed NEtP calculated at S2 is higher than the target engine rotational speed NEt (or the actual engine rotational speed NE) before the shifting.

Regardless of the determination result at S3, at S4 and S5 which correspond to the electric motor rotation increasing/decreasing means 94, it is determined whether the target first electric motor rotational speed NM1t increases. The determination is, for example, made based on whether the post-shifting prospected first electric motor rotational speed NM1P calculated at S2 is higher than the target first electric motor rotational speed NM1t (or the actual first electric motor rotational speed NM1) before the shifting.

When both of the determinations at S3 and S4 are affirmed or both of the determinations at S3 and S5 are negated, that is, when the increasing/decreasing direction of the first electric motor rotational speed NM1 before and after the shifting, and the increasing/decreasing direction of the engine rotational speed NE before and after the shifting are the same, the procedure i.e., sequence goes to S6 corresponding to the electric motor rotational change amount restraining means 86. At S6, a command is output before inertia phase initiation during the shifting of the automatic transmission portion 20, for starting the gradual change of the first electric motor rotational speed NM1 so as to have a predetermined gradient from the first electric motor rotational speed NM1 at the timing when the shifting process of the transmission mechanism 10 is determined at S1.

Meanwhile, when the determination at S3 is affirmed and the determination at S4 is negated, or the determination at S3 is negated and the determination at S5 is affirmed, the procedure advances to S7 which corresponds to the electric motor rotational change amount restraining means 86. In this case, the increasing/decreasing direction of the first electric motor rotational speed NM1 before and after the shifting, and the increasing/decreasing direction of the engine rotational speed NE before and after the shifting are different. At S7, a command is output for maintaining the first electric motor rotational speed NM1 in the first electric motor rotational speed NM1 at the timing when S1 determines that the transmission mechanism 10 is in a process of the shifting, until the inertia phase initiation during the shifting of the automatic transmission portion 20.

Subsequent to S6 or S7, at S8 which correspond to the inertia phase initiation determining means 96, for example, the actual initiation of the inertia phase is determined based on whether the change amount of the second electric motor rotational speed NM2 exceeds the predetermined rotational change amount.

When the determination at S8 is negated, the present routine is terminated. When the determination at S8 is affirmed, at S9 which corresponds to the electric motor rotational change amount restraining means 86, in place of the command at S6 or S7, a command is output for gradually changing the first electric motor rotational speed NM1 depending on a ratio of the change of the second electric motor rotational speed NM2. The output changes the first electric motor rotational speed NM1 from the first electric motor rotational speed NM1 upon determination of the inertia phase initiation at S8 during the inertia phase towards the post-shifting prospected first electric motor rotational speed NM1P after shifting.

In FIG. 11, timing t1 shows with determination of a power-on downshift by the depression operation of the accelerator pedal, shifting commands are respectively output for executing the shifting of the differential portion 11 and the shifting of the automatic transmission portion 20. Further, timing t2 shows that the inertia phase initiation during the shifting of the automatic transmission portion 20 is determined. In the embodiment of FIG. 11, the target engine rotational speed NEt increases towards the post-shifting prospected target engine rotational speed NEtP at timing t4, and the target first electric motor rotational speed NM1t increases towards the post-shifting estimated first electric motor rotational speed NM1P. That is, the increasing/decreasing direction of the first electric motor rotational speed NM1 before and after the shifting, and the increasing/decreasing direction of the engine rotational speed NE before and after the shifting are the same. Consequently, the gradual change of the first electric motor rotational speed NM1 starts from the shifting command output time at timing t1 so as to have the predetermined gradient.

After the inertia phase initiating determination at timing t2, the first electric motor rotational speed NM1 is gradually changed after shifting so as to have the post-shifting estimated first electric motor rotational speed NM1P depending on the change ratio of the second electric motor rotational speed NM2. Thereby, as compared with the conventional example shown by the broken line, the first electric motor rotational speed NM1 is changed by the small rotational change amount smoothly, from the shifting output time at timing t1 to the shifting completion time at timing t4 (that is, the rotational change amount of the first electric motor rotational speed NM1 can be minimized). As a result, the input torque change of the automatic transmission portion 20 can be restrained to the minimum so as to restrain a shifting shock of the automatic transmission portion 20.

In FIG. 12, timing t1 shows with determination of the power-on downshift by the depression operation of the accelerator pedal, shifting commands are respectively output for executing the shifting of the differential portion 11 and the shifting of the automatic transmission portion 20. Further, timing t2 shows that the inertia phase initiation during the shifting of the automatic transmission portion 20 is determined. In this embodiment of FIG. 12, the target engine rotational speed NEt increases towards the post-shifting estimated target engine rotational speed NEtP at timing t4, and the target first electric motor rotational speed NM1t lowers towards the post-shifting prospected first electric motor rotational speed NM1P. That is, the increasing/decreasing direction of the first electric motor rotational speed NM1 before and after shifting and the increasing/decreasing direction of the engine rotational speed NE before and after the shifting are different. Consequently, from the shifting command output time at timing t1 to the inertia phase initiating determination at timing t2, the first electric moor rotational speed NM1 is maintained (fixed).

After the inertia phase initiating determination at timing t2, the first electric motor rotational speed NM1 is gradually changed depending on the change ratio of the second electric motor rotational speed NM2 so as to reach the post-shifting estimated first electric motor rotational speed NM1P. Thereby, as compared with the conventional example shown by the broken line, the first electric motor rotational speed NM1 is smoothly changed by the small rotational change amount from the shifting output time at timing t1 to the shifting completion time at timing t4 (that is, the rotational change amount of the first electric motor rotational speed NM1 can be minimized). As a result, the input torque change of the automatic transmission portion 20 can be restrained to the minimum so as to restrain a shifting shock of the automatic transmission portion 20.

As described above, according to the present embodiment, when the shifting in the differential portion 11 and the shifting in the automatic transmission portion 20 are overlapped in the shifting periods thereof, in other words, the both shiftings are executed in the overlapping way in the shifting periods, the first electric motor M1 is controlled by the electric motor rotational change amount restraining means 86, to have the restrained change amount of the first electric motor rotational speed NM1 before and after the shifting of the transmission mechanism 10. Consequently, the unnecessary rotational change of the first electric motor M1 can be restrained.

Further, according to the present embodiment, the first electric motor M1 is controlled by the electric motor rotational change amount restraining means 86, based on the post-shifting estimated first electric motor rotational speed NM1P calculated by the post-shifting prospected electric motor rotation prospecting means 90. Thus, the first electric motor rotational speed NM1 can be changed towards the post-shifting estimated first electric motor rotational speed NM1P. Thereby, it can be avoided that the rotational change direction of the first electric motor M1 resulted from the shifting of the differential portion 11 and the rotational change direction of the first electric motor M1 during the inertia phase resulted from the shifting of the automatic transmission portion 20 are directed i.e., oriented in the opposite directions. As a result, the unnecessary rotational change of the first electric motor M1 can be restrained.

Further, according to the present embodiment, the first electric motor M1 is controlled by the electric motor rotational change amount restraining means 86, to have the minimized change amount of the first electric motor rotational speed NM1 before and after the shifting of the transmission mechanism 10. Consequently, the unnecessary rotational change of the first electric motor M1 can be appropriately restrained.

Further, according to the present embodiment, the electric motor rotational change amount restraining means 86 changes the start timing of changing the first electric rotational speed NM1 as follows. The change is executed considering the increasing/decreasing direction of the first electric motor rotational speed NM1 before and after the shifting based on the post-shifting prospected first electric motor rotational speed NM1P, and the increasing/decreasing direction of the engine rotational speed NE before and after the shifting based on the post-shifting estimated target engine rotational speed NEtP. Consequently, the unnecessary rotational change of the first electric motor M1 can be more appropriately restrained.

Further, according to the present embodiment, when the increasing/decreasing direction of the first electric motor rotational speed NM1 and the increasing/decreasing direction of the engine rotational speed NE are the same, the electric motor rotational change amount restraining means 86 changes the first electric motor rotational speed NM1 before inertia phase initiation during the shifting of the automatic transmission portion 20. Consequently, the shifting of the differential portion 11 can be quickly started.

Further, according to the present embodiment, when the increasing/decreasing direction of the first electric motor rotational speed NM1 and the increasing/decreasing direction of the engine rotational speed NE are different, the electric motor rotational change amount restraining means 86 changes the first electric motor rotational speed NM1 after initiating the inertia phase during the shifting of the automatic transmission portion 20. Consequently, the engine rotational speed NE can be prevented from being once rotationally changed towards the opposite direction to the post-shifting estimated target engine rotational speed NEtP.

Further, according to the present embodiment, after initiating the inertia phase during the shifting of the automatic transmission portion 20, the electric motor rotational change amount restraining means 86 changes the first electric motor rotational speed NM1 depending on the change of the second electric motor rotational speed NM2. Consequently, the first electric motor rotational speed NM1 can be appropriately changed towards the post-shifting prospected first electric motor rotational speed NM1P.

Next, another embodiment of the present invention will be described. In the following description, the parts common to the respective embodiments are attached with the same reference numerals and the description thereof will be omitted.

Second Embodiment

In the embodiment described as above, the control operation by the electric motor rotational change amount restraining means 86 is explained, which controls the unnecessary rotational change of the first electric motor M1 when the differential portion 11 and the automatic transmission portion 20 execute the shiftings in the overlapping way in the shifting periods. Here, it is noted that when the automatic transmission portion 20 is continuously shifted, there is a fear that the control operation by the electric motor rotational change amount restraining means 86 can not be applied as it is. For example, such problem occurs in a case of the continuous shifting with a first shifting in which the increasing/decreasing directions of a first electric motor rotational speed NM1 and an engine rotational speed NE are the same, and a second shifting in which the increasing/decreasing directions thereof are different. In such case, the increasing/decreasing directions of the first electric motor rotational speed NM1 are reversed between two shiftings, thus occurring the unnecessary rotational change of the first electric motor rotational speed NM1.

Expression "continuous shifting" means that the first shifting and the second shifting of the same kind are continuously executed in the automatic transmission portion 20. In the present embodiment, so-called skip shift in which the shifting stage of the automatic transmission portion 20 is skipped is referred to i.e., defined as a single shifting similarly to the ordinary shifting. For example, a continuous shifting of the 4th→3rd downshift as the first shifting and the 3rd→2nd downshift as the second shifting are referred to as the continuous shifting. The 4th→2nd downshift as the skip shift executed without establishing an intermediate third speed-gear stage is defined as the single shifting. Consequently, for the 4th→2nd downshift, the control operation by the electric motor rotational change amount restraining means 86 is applied as it is.

Figure 16:
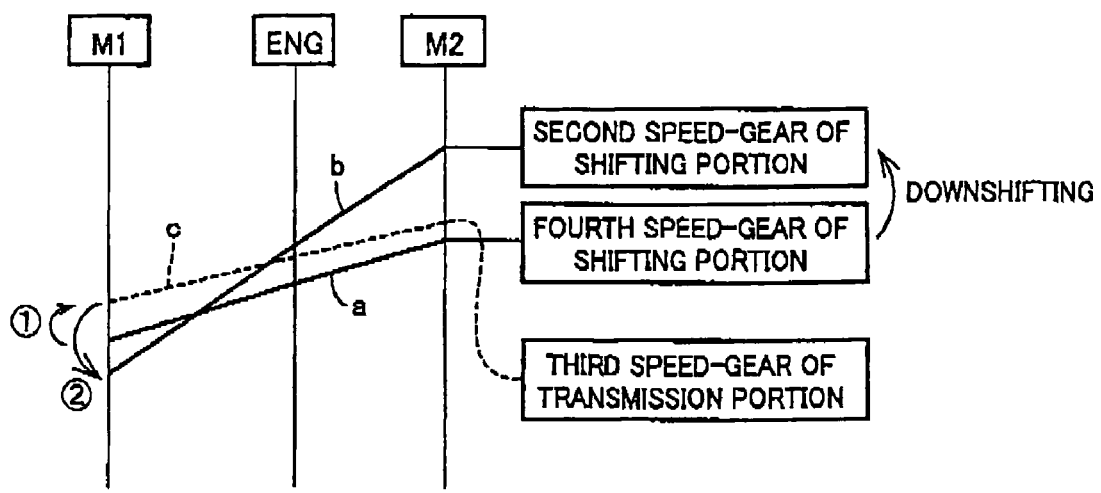
FIG. 16 is a collinear chart equivalent to FIG. 15, and is a view representing in the collinear chart an example of the rotational change of each rotational element in the differential portion, when a continuous shifting of the automatic transmission portion is executed in the shifting of the transmission mechanism.

FIG. 16 showing a collinear chart equivalent to FIG. 15 represents one example of the rotational change of each rotational element in the differential portion 11, when the automatic transmission portion 20 executes the continuous shifting in the shifting of the transmission mechanism 10. In FIG. 16, a solid line "a" shows the relative relation of the rotational speed of each rotational element before the downshift, and a solid line b shows the relative relation thereof after the downshift. Upon changing the relative relation from the solid line "a" to the solid line b, when the downshift of the automatic transmission portion 20 is the skip shift (single shifting) to execute the 4th→2nd downshift, execution of the control operation by the electric motor rotational change amount restraining means 86 can restrain the unnecessary rotational change of the first electric motor M1.

However, upon changing the relative relation from the solid line "a" to the solid line b, the automatic transmission portion 20 executes the continuous shifting including the 4th→3rd downshift and the 3rd→2nd downshift, following problem may occur. That is, when the control operation is executed by the electric motor rotational change amount restraining means 86 in each downshift, the relative relation is sometimes changed from the solid line "a" once to the broken line c (state shown by ①) by the 4th→3rd downshift, and to the solid line b by the subsequent 3rd→2nd downshift. Then, as evident from the drawings, the first electric motor rotational speed NM1 once increased is lowered, so that the unnecessary rotational change of the first electric motor M1 occurs.

In view of the above, in the present embodiment, the electric motor rotational change amount restraining means 86 changes the control of the first electric motor M1 based on whether the automatic transmission portion 20 executes the continuous shifting in the shifting of the transmission mechanism 10, in addition to the changing operation in the embodiment as described above. For example, when the automatic transmission portion 20 executes the single shifting, the electric motor rotational change amount restraining means 86 outputs to the hybrid control means 84 a command for controlling the first electric motor M1 similarly to the embodiment as described above. Meanwhile, when the automatic transmission portion 20 executes the continuous shifting in the shifting of the transmission mechanism 10, the electric motor rotational change amount restraining means 86 outputs to the hybrid control means 84 a command for keeping or holding the first electric motor rotational speed NM1 constant until the first shifting is terminated, that is, during the shifting of the first shifting.

Further, a case where the second shifting is determined during the first shifting of the automatic transmission portion 20 in the shifting of the transmission mechanism 10 is included in the continuous shifting. Consequently, when the second shifting is determined during the first shifting of the automatic transmission portion 20 in the shifting of the transmission mechanism 10, the electric motor rotational change amount restraining means 86 outputs the following command to the hybrid control means 84. This command maintains the first electric motor rotational speed NM1 in the first electric motor rotational speed NM1 upon determination of the second shifting, until the first shifting terminates the shifting, that is, during the shifting of the first shifting.

Further, the shifting determining means 88 performs the following determination in addition to the determination in the above described embodiment upon the simultaneous shiftings in both the differential portion 11 and the automatic transmission portion 20. That is, the shifting determining means 88 determines whether the automatic transmission portion 20 executes the continuous shifting, and upon determination of the continuous shifting of the automatic transmission portion 20, it determines whether the first shifting in the continuous shifting is under the shifting. Whether the first shifting is under the shifting is, for example, determined based on the shifting determination of the automatic transmission portion 20 by the step-variable shift control means 82.

Figure 13:
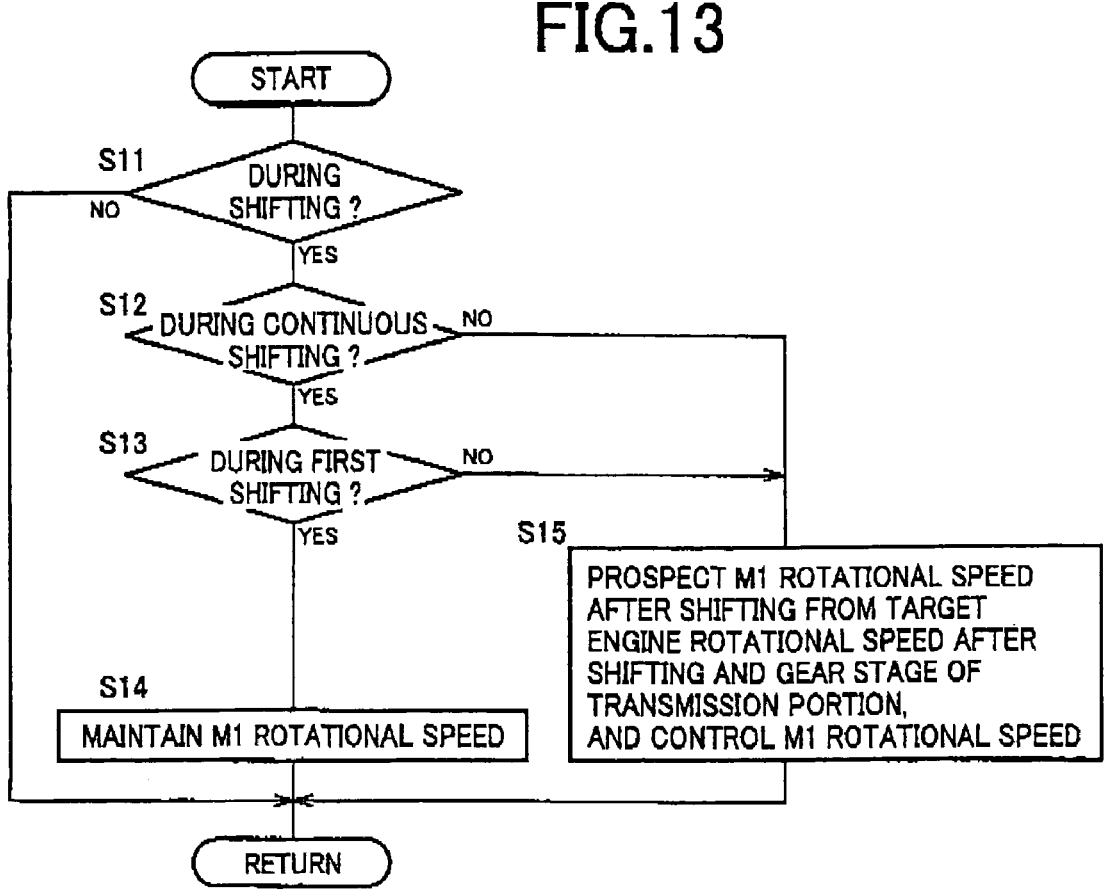
FIG. 13 is a flowchart explaining a control operation of an electronic control unit of FIG. 4, that is the control operation for restraining an unnecessary rotational change of a first electric motor, when shiftings in a differential portion and in a transmission portion are overlapped in the shifting periods, which is executed in addition to the control operation in FIG. 10.

FIG. 13 shows a flowchart explaining a major parts of the control operation of the electronic control unit 80, that is, the control operation for restraining the unnecessary rotational change of the first electric motor M1, when the differential portion 11 and the automatic transmission portion 20 execute the shiftings in the overlapped way in the shifting periods. This sequence is, for example, repeatedly executed at extremely short cycles of several msec to several tens msec. This flowchart of FIG. 13 is executed in addition the control operation for restraining the rotational change of the first electric motor M1 in the flowchart of FIG. 10.

Figure 14:
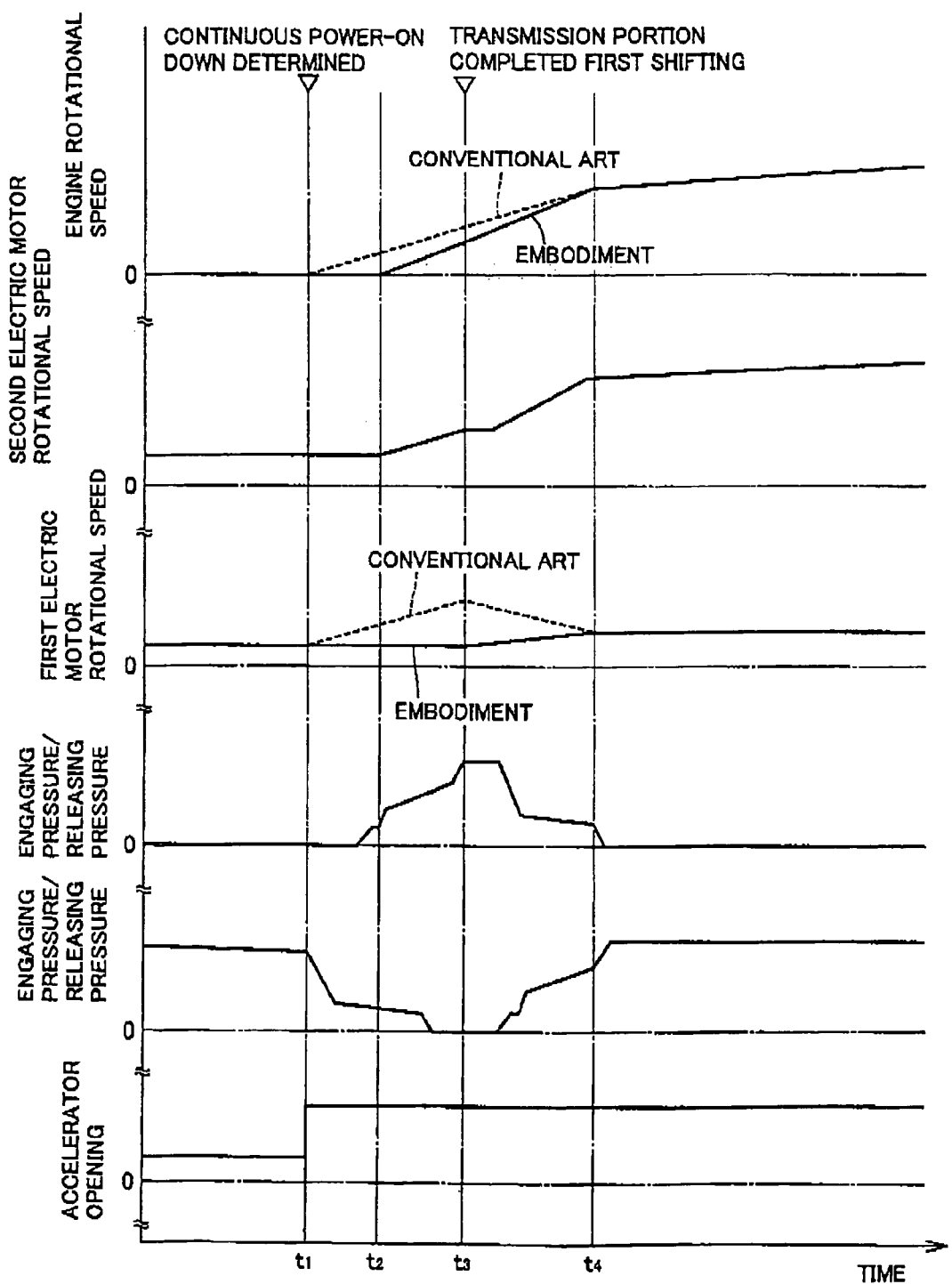
FIG. 14 is a time chart explaining the control operation shown in the flowchart of FIG. 13, and is an example to execute a continuous power-on downshift by the depression operation of an accelerator pedal.

FIG. 14 shows a time chart explaining the control operation shown in the flowchart of FIG. 13, and shows one example where a continuous power-on downshift is performed by the depression operation of the accelerator pedal.

In FIG. 13, first, at S11 which corresponds to the shifting determining means 88, it is determined whether the transmission mechanism 10 is in a process of the shifting, that is, whether the differential portion 11 and the automatic transmission portion 20 execute the shiftings in the overlapped in the shifting periods.

When the determination at S11 is negated, the present routine is terminated. When the determination at S11 is affirmed, at S12 which corresponds to the shifting determining means 88, it is determined whether the shifting in the automatic transmission portion 20 is the continuous shifting to continuously execute the first shifting and the second shifting, for example, whether the 4th→3rd downshift and the 3rd→2nd downshift are continuously executed.

When the determination at S12 is affirmed, at S13, which corresponds to the shifting determining means 88, it is determined whether the first shifting in the continuous shifting of the automatic shifting portion 20 is in a process of the shifting i.e., under the shifting.

When the determination at S13 is affirmed, at S14 which corresponds to the electric motor rotational change amount restraining means 86, a command is output for maintaining the first electric motor rotational speed NM1 in a predetermined value, until the first shifting is terminated, that is, during the shifting of the first shifting. The predetermined value, for example, is referred to the first electric motor rotational speed NM1 at timing when the transmission mechanism 10 is in a process of the shifting at S1 is determined.

When the determination at S12 is negated, or the determination at S13 is negated the shifting is defined as the single shifting. The determination is S13 is negated when the first shifting and the second shifting are in the different shifting direction, and the first shifting and the second shifting of the same directions are continuously but independently executed step by step. Consequently, at S15 which corresponds to the flowchart of FIG. 10, the first electric motor rotational speed NM1 is controlled toward the post-shifting prospected first electric motor rotational speed NM1P to minimize the change amount of the first electric motor rotational speed NM1 before and after the shifting of the transmission mechanism 10. That is, as described at S2 to S9 of FIG. 10, from the shifting command output timing t1 to the inertia phase initiating determination timing t2, the first electric motor rotational speed NM1 is maintained (fixed).

After the inertia phase initiating determination at timing t2, the first electric motor rotational speed NM1 is gradually changed to have the post-shifting prospected first electric motor rotational speed NM1P depending on change rate of the second electric motor rotation speed NM2. Thereby, the first electric motor rotational speed NM1 is changed smoothly by the small rotational change amount from the shifting output timing t1 to the shifting completion timing t4, so that the input torque change of the automatic transmission portion 20 can be restrained to the minimum so as to restrain a shifting shock of the automatic transmission portion 20.

In FIG. 14, timing t1 shows that, with the continuous power-on downshift determined by the depression operation of the accelerator pedal, a shifting command is output for executing the shifting of the differential portion 11 and the shifting of the automatic transmission portion 20 continuously. Further, the time period from timing t1 to timing t3 shows execution of the first shifting in the automatic transmission portion 20, and the time period from timing t3 to timing t4 shows execution oft the second shifting of the automatic transmission portion 20. In a time period from timing t1 to timing t3 to execute the first shifting, the first electric motor rotational speed NM1 is maintained (fixed) in the first electric motor rotational speed NM1 at timing t1 until timing t3 to complete the first shifting. Since the first electric motor rotational speed NM1 is maintained during the first shifting in this manner, the engine rotational speed NE is increased only by the shifting of the automatic transmission portion 20 accompanied with the inertia phase initiating at timing t2.

Further, on and after timing t3 to determine termination of the first shifting, likewise the embodiment as described above, the first electric motor rotational speed NM1t is controlled toward the post-shifting prospected first electric rotational speed NM1P at timing t4. Thereby, the first electric motor rotational speed NM1 is changed by the small rotational change amount smoothly, from the first shifting output to the second shifting termination, that is, from the shift output time at timing t1 to the shift termination time at timing t4 (that is, the rotational change amount of the first electric motor rotational speed NM1 can be minimized). As a result, the input torque change of the automatic transmission portion 20 can be restrained to the minimum so as to restrain a shifting shock of the automatic transmission portion 20. This is different from the conventional example shown by the broken line in which the first electric motor rotational speed NM1t is controlled toward the post-shifting prospected first electric motor rotational speed NM1P at every shifting.

As described above, according to the present embodiment, in addition to the effects of the above described embodiment, the following effects can be obtained. First, when the shifting periods in the differential portion 11 and the automatic transmission portion 20 are overlapped, the first electric motor M1 is controlled by the electric motor rotational change amount restraining means 86, based on whether the automatic transmission portion 20 executes the continuous shifting, so as to restrain the rotational change amount of the first electric motor rotational speed NM1 before and after the shifting of the transmission mechanism 10. As a result, the unnecessary rotational change of the first electric motor M1 can be restrained.

Further, according to the present embodiment, when the shifting of the automatic transmission portion 20 is the continuous shifting, the first electric motor rotational speed NM1 is maintained until the first shifting is completed by the electric motor rotational change amount restraining means 86. As a result, the unnecessary rotational change of the first electric motor M1 can be appropriately restrained.

Further, according to the present embodiment, when the second shifting of the automatic transmission portion 20 is determined in the midst of the shifting thereof, the first electric motor rotational speed NM1 is maintained in the first electric motor rotational speed NM1 upon the second shifting determination until the first shifting is completed by the electric motor rotational change amount restraining means 86. As a result, the unnecessary rotational change of the first electric motor M1 can be appropriately restrained.

Further, according to the present embodiment, when the continuous shifting including the first shifting and the second shifting of the same shifting direction are continuously executed in the transmission portion, the electric motor rotational change amount restraining means 86 maintains or fixes the first electric motor rotational speed until the first shifting is completed. Consequently, in the continuous shifting of the automatic transmission portion 20, the rotational change of the first electric motor during the first shifting is prevented, to restrain the unnecessary rotational change of the first electric motor M1.

Further, according to the present embodiment, when the second shifting of the same direction as the first shifting is determined during the first shifting of the automatic transmission portion 20, the electric motor rotational change amount restraining means 86 maintains or fixes the first electric motor rotational speed until the first shifting is terminated. Consequently, when the second shifting is determined in the automatic transmission portion 20 during the first shifting thereof, the rotational change of the first electric motor M1 is prevented until the first shifting is terminated, followed by execution of the second shifting. As a result, the rotational change of the first electric motor M1 in the continuous shifting can be restrained.

Further, according to the present embodiment, when the first shifting and the second shifting of the different shifting direction in the automatic transmission portion 20 are continuously executed in the transmission portion, the electric motor rotational change amount restraining means 86 assumes the second shifting as the single shifting after the determination of the second shifting, to control the first electric motor rotational speed NM1 in the same way as the single shifting. That is, the electric motor rotational change amount restraining means 86 does not hold the first electric motor rotational speed constant until the second shifting is terminated, but controls the first electric motor rotational speed NM1 so as to minimize the change amount of the first electric motor rotational speed NM1 before and after the shifting. As a result, the rotational change of the first electric motor M1 is restrained in both the first shifting and the second shifting, respectively.

Further, according to the present embodiment, the electric motor rotational change amount restraining means 86 controls the first electric motor rotational speed NM1 so as to minimize the change amount of the first electric motor rotational speed NM1 before and after the shifting, based on the prospected value after the final shifting of the continuous shifting, that is, based on the prospected value of the second electric motor rotational speed NM2 after the second shifting, and the prospected value of the target engine rotational speed. In other words, after the final shifting in the continuous shifting, the first electric motor rotational speed NM1 is controlled so as to minimize the change amount of the first electric motor rotational speed NM1 before and after the shifting, based on the prospected value of the second electric motor rotational speed NM2 and the prospected value of the target engine rotational speed. Consequently, the rotational change of the first electric motor M1 in this continuous shifting is restrained.

Further, according to the present embodiment, when the first shifting and the second shifting of the same direction are continuously but independently shifted step by step in the automatic transmission portion 20, the electric motor rotational change amount restraining means 86 operates as follows. That is, the electric motor rotational change amount restraining means 86 controls the first electric motor rotational speed NM1 to minimize the change amount before and after the shifting, based on the prospected value of the second electric motor rotational speed NM2 and the prospected value of the target engine rotational speed. Consequently, even when the first shifting and the second shifting execute the shifting continuously but independently step by step, the rotational changes of the first electric motor M1 is restrained in the first shifting and the second shifting, respectively.

While various embodiments of the present invention are explained in detail based on the drawings, it is to be understood that the present invention can be executed by combining the illustrated embodiments, or can also be executed in other embodiments.

For example, in the illustrated embodiments, the electric motor rotational change amount restraining means 86 changes the first electric motor rotational speed NM1 as follows in the single shifting of the automatic transmission portion 20, or upon the second shifting in the continuous shifting. In other words, after initiating the inertia phase, the first electric motor rotational speed NM1 is changed from the first electric motor rotational speed NM1 upon determination of the inertia phase initiation toward the post-shifting prospected first electric motor rotational speed NM1P. However, the first electric motor rotational speed NM1 may be kept constant until the automatic transmission portion 20 completes the shifting. In this manner, the rotational change of the first electric motor M1 during the inertia phase caused by the shifting of the automatic transmission portion 20 can be prevented, so that the unnecessary rotational change of the first electric motor M1 can be restrained.

Further, in associating with the control operation for maintaining the first electric motor rotational speed NM1 constant until the automatic transmission portion 20 completes the shifting, when the shifting of the differential portion 11 is determined during the shifting of the automatic transmission portion 20 is determined, to execute both shiftings in the overlapped way in shifting periods, the electric motor rotational change amount restraining means 86 may operate as follows. That is, the first electric motor rotational speed NM1 may be maintained in the first electric motor rotational speed NM1 at the timing when the differential portion 11 completes the shifting, until the automatic transmission portion 20 completes the shifting. Thereby, after determination of the shifting of the differential portion 11 during the shifting of the automatic transmission portion 20, when the differential portion 11 and the automatic transmission portion 20 execute the shifting in the overlapped way in the shifting periods, the unnecessary rotational change of the first electric motor M1 can be restrained.

Further, according to the illustrated embodiments, an post-shifting electric motor rotation prospecting means 90 calculates the post-shifting prospected first electric motor rotational speed NM1P based on the post-shifting estimated transmitting member rotational speed N18 and the post-shifting estimated target engine rotational speed NEtP. However, in place of the post-shifting estimated target engine rotational speed NEtP, the estimated value of the actual engine rotational speed NE after the shifting of the transmission mechanism 10 may be used. For example, the post-shifting electric motor rotation prospecting means 90 calculates the estimated value of the actual engine rotational speed NE after the shifting (=the output shaft rotational speed NOUT×the estimated value of the actual total speed ratio γT after shifting) using an output shaft rotational speed NOUT and the estimated value of the actual total speed ratio γT after the shifting. Thereby, the post-shifting prospected first electric motor rotational speed NM1P is appropriately calculated.

Further, in the illustrated embodiments, when the differential portion 11 and the automatic transmission portion 20 execute the shifting in the overlapped way in shifting periods, the electric motor rotational change amount restraining means 86 controls the first electric motor M1 so as to restrain the change amount of the first electric motor rotational speed NM1 before and after the shifting. However, when the shifting of the differential portion 11 and the shifting of the automatic transmission portion 20 are of different kinds, the control of the first electric motor M1 may be not performed. For example, there is a case where for setting the engine rotational speed NE approximately constant before and after the shifting, that is, for setting the total speed ratio γT approximately constant, the opposite kinds of shiftings such as the shifting (for example, downshift) of the automatic transmission portion 20 and the shifting (for example, up-shift) of the differential portion 11 are executed respectively.

In this case, the rotational change direction of the first electric motor M1 by the shifting of the differential portion 11, and the rotational change direction of the first electric motor M1 by the rotational change of the transmitting member 18 during the inertia phase in the shifting of the automatic transmission portion 20 are directed in the same direction. In other words, due to absence of generation of the unnecessary rotational change of the first electric motor M1, the control of the first electric motor M1 is not required. In this manner, the stagnated shifting resulted from execution of the control operation for restraining the unnecessary rotational change of the first electric motor M1 is prevented.

Further, in the illustrated embodiments, in the continuous shifting of the automatic transmission portion 20, two shiftings i.e., the first shifting and the second shifting are continuously executed. However, the present invention can be applied even to the shifting in which three or more shiftings are continuously executed. In this case, for example, the first electric motor rotational speed NM1 is kept constant until the final shifting is started.

In the illustrated embodiment set forth above, while the differential portion 11 (power distributing mechanism 16) is configured to function as the electrically controlled continuously variable transmission in which the speed ratio γ0 is continuously varied from the minimal value $\gamma 0_{min}$ to the maximal value $\gamma 0_{max}$, the present invention may be applied even to a case wherein the speed ratio γ0 of the differential portion 11 is not continuously varied but pretended to vary step-by-step with the use of a differential action.

Further, in the illustrated embodiments, the differential portion 11 may be provided with the differential limiting device disposed in a power distributing mechanism 16 and limits the differential operation for causing the power distributing mechanism 16 to operate as a step-variable transmission having at least of two forward stages. The present invention is applied to the running i.e., driving of the vehicle when the differential operation of the differential portion 11 (power distributing mechanism 16) is not limited exclusively by this differential limiting device.

With the power distribution mechanisms 16 of the illustrated embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement, and the engine 8, first electric motor M1 and power transmitting member 18 have no objection to be connected to either one of the three elements CA1, S1 and R1 of the first planetary gear set 24.

Although the illustrated embodiment is described with reference to the engine 8 directly connected to the input shaft 14, these component parts may suffice to be operatively connected via, for instance, gears, belts or the like. No need may arise for the engine 8 and the input shaft 14 to be necessarily disposed on a common axis.

Further, while the illustrated embodiment is described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S1 through gears, a belt or the like, and the second electric motor M2 may be connected to the power transmitting member 18.

In the illustrated embodiment, further, the hydraulically operated frictional coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches.

In the illustrated embodiment, further, the automatic transmission portion 20 is disposed in the power transmitting path between the power transmitting member 18 serving as the output member of the differential portion 11, that is the power distributing mechanism 16 and the drive wheels 34. However, the power transmitting path may incorporate a transmission portion (power transmission) of other types such as, for instance, a continuously variable transmission (CVT), acting as an automatic transmission of one kind, and an automatic transmission or the like including a constant-mesh type parallel shaft transmission, well known as a manual shift transmission, which is operative to automatically switch gear positions using select cylinders and shift cylinders. The present invention may be implemented even in such a way.

While the illustrated embodiment is described above with reference to the automatic transmission portion 20 that is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmitting capability via a set of transmitting members structured of, for instance, a counter-gear pair acting as the power transmitting member 18, a sprocket and a chain.

Further, the power distributing mechanism 16 of the illustrated embodiment may include, for instance, a differential gear set in which a pinion, rotatably driven with the engine, and a pair of bevel gears, held in meshing engagement with the pinion, are operatively connected to the first electric motor M1 and the power transmitting member 18 (second electric motor M2).

The power distributing mechanism 16 of the illustrated embodiment has been described above as including one set of planetary gear units, the power distributing mechanism 16 may include two or more sets of planetary gear units that are arranged to function as a transmission having three or more speed positions under a non-differential state (fixed shifting state). In addition, the planetary gear unit is not limited to the single-pinion type, but may be of a double-pinion type.

While the shift operating device 50 of the illustrated embodiment has been described with reference to the shift lever 52 operative to select a plurality of kinds of shift positions $P_{SH}$, the shift lever 52 may be replaced by other type of switches or devices. These may include, for instance: a select switch such as a press-button type switch and a slide-type switch available to select one of a plurality of shift positions $P_{SH}$; a device operative to switch a plurality of shift positions $P_{SH}$ in response not to the manipulation initiated by the hand but to a driver's voice; and a device operative to switch a plurality of shift positions $P_{SH}$ in response to the manipulation initiated by the foot. While the illustrated embodiment is described with reference to the shifting range that is established upon manipulating the shift lever 52 to the "M" position, the gear positions may be set, i.e., maximal speed gear positions for respective shifting ranges may be set as the gear positions. In this case, the automatic transmission portion 20 operates so as to allow the gear positions to be switched for executing the shifting action. For example, as the shift lever 52 is manually operated to an up-shift position "+" or a down-shift position "−" in the "M" position, the automatic transmission portion 20 operates so as to allow any of the 1st-speed gear position to the 4th-speed gear position to be set depending on the manipulation of the shift lever 52.

While some embodiments of the invention have been illustrated as above, the invention may be achieved with various modifications and improvements based on the knowledge of those skilled in the art.

The invention claimed is:

1. A control device of a vehicular driving apparatus, comprising: (i) a differential portion with a differential mechanism including a first element connected to an engine, a second element connected to a first electric motor, and a third element connected to a transmitting member, and distributing an output of the engine to the first electric motor and the transmitting member, to function as a part of a transmission; and (ii) a transmission portion disposed in a power transmitting path extending from the transmitting member to drive wheels for functioning as a step-variable automatic transmission, the control device including electric motor rotational change amount restraining means, when a shifting of the differential portion and a shifting of the transmission portion are overlapped in shifting periods, that controls the first electric motor to restrain a change amount of a first electric motor rotational speed before and after the shifting of a shifting mechanism including the differential portion and the transmission portion.

2. The control device of the vehicular driving apparatus according to claim 1, further comprising post-shifting electric motor rotation prospecting means that calculates an estimated value of the first electric motor rotational speed after the shifting, based on an estimated value of a transmitting member rotational speed and an estimated value of an engine rotational speed after the shifting, wherein the electric motor rotational change amount restraining means controls the first electric motor based on a prospected value calculated by the post-shifting electric motor rotation prospecting means.

3. The control device of the vehicular driving apparatus according to claim 2, wherein the electric motor rotational change amount restraining means controls the first electric motor to minimize the change amount of the first electric motor rotational speed before and after the shifting.

4. The control device of the vehicular driving apparatus according to claim 2, wherein the electric motor rotational change amount restraining means changes a start timing of changing the first electric motor rotational speed, based on (i) an increasing/decreasing direction of the first electric motor rotational speed before and after the shifting based on the prospected value calculated by the post-shifting electric motor rotation prospected means, and (ii) an increasing/decreasing direction of the engine rotational speed before and after the shifting based on the estimated value of the engine rotational speed.

5. The control device of the vehicular driving apparatus according to claim 4, wherein when the increasing/decreasing direction of the first electric motor rotational speed and the increasing/decreasing direction of the engine rotational speed are directed in the same directions, the electric motor rotational change amount restraining means changes the first electric motor rotational speed before an inertia phase initiation of a shifting period of the transmission portion.

6. The control device of the vehicular driving apparatus according to claim 4, wherein when the increasing/decreasing direction of the first electric motor rotational speed and the increasing/decreasing direction of the engine rotational speed are directed in different directions, the electric motor rotational change amount restraining means changes the first electric motor rotational speed after an inertia phase initiation of a shifting period of the transmission portion.

7. The control device of the vehicular driving apparatus according to claim 4, wherein the electric motor rotational change amount restraining means changes the first electric motor rotational speed depending on the change of the transmitting member rotational speed after an inertia phase initiation of a shifting period of the transmission portion.

8. The control device of the vehicular driving apparatus according to claim 1, wherein the electric motor rotational change amount restraining means holds the first electric motor rotational speed constant until the shifting of the transmission portion is completed.

9. The control device of the vehicular driving apparatus according to claim 8, wherein when the shifting of the differential portion is determined during the shifting of the transmission portion, the electric motor rotational change amount restraining means holds the first electric motor rotational speed in a first electric motor rotational speed upon the determination.

10. The control device of the vehicular driving apparatus according to claim 8, wherein when different kinds of the shiftings are executed in the differential portion and the transmission portion, which are different in an increasing/decreasing direction of the first electric motor rotational speed and an increasing/decreasing direction of the engine rotational speed before and after the shifting, the electric motor rotational change amount restraining means does not hold the first electric motor rotational speed constant.

11. The control device of the vehicular driving apparatus according to claim 1, wherein when a continuous shifting to continuously execute a first shifting and a second shifting which are the same in change directions of gear ratios is executed in the transmission portion, the electric motor rotational change amount restraining means holds the first electric motor rotational speed until the first shifting is completed.

12. The control device of the vehicular driving apparatus according to claim 11, wherein during the first shifting of the transmission portion when the second shifting of the same direction as the first shifting in change directions of gear ratios is determined, the electric motor rotational change amount restraining means holds the first electric motor rotational speed until the first shifting is completed.

13. The control device of the vehicular driving apparatus according to claim 1, wherein when a first shifting and a second shifting of different shifting directions in change directions of gear ratios are continuously executed in the transmission portion, the electric motor rotational change amount restraining means, assuming the second shifting as a single shifting from the determination of the second shifting, controls the first electric motor rotational speed to minimize the change amount of the first electric motor rotational speed before and after the shifting, likewise a single shifting.

14. The control device of the vehicular driving apparatus according to claim 11, wherein the electric motor rotational change amount restraining means controls the first electric motor rotational speed to minimize the change amount of the first electric motor rotational speed before and after the shifting, based on a prospected value of a second electric motor rotational speed and a prospected value of a target engine rotational speed after the second shifting.

15. The control device of the vehicular driving apparatus according to claim 11, wherein when the first shifting and the second shifting of the same direction in change directions of gear ratios are continuously but independently executed step by step in the transmission portion, the electric motor rotational change amount restraining means controls the first electric motor rotational speed so as to minimize the change amount of the first electric motor rotational speed before and after each shifting, respectively, based on a prospected value of a second electric motor rotational speed and a prospected value of a target engine rotational speed.

16. The control device of the vehicular driving apparatus according to claim 1, wherein the differential portion is operated as a continuously variable transmission with controlling an operating state of the first electric motor.

* * * * *